US012609428B2

(12) United States Patent
Liu et al.

(10) Patent No.: US 12,609,428 B2
(45) Date of Patent: Apr. 21, 2026

(54) PHASE SHIFTER COMPRISING SIGNAL AND REFERENCE ELECTRODES ON A SUBSTRATE AND FORMING A GAP WITH A PLURALITY OF SPACED FILM-BRIDGE ELECTRODES

(71) Applicant: BOE TECHNOLOGY GROUP CO., LTD., Beijing (CN)

(72) Inventors: Jianxing Liu, Beijing (CN); Jingwen Guo, Beijing (CN); Qianhong Wu, Beijing (CN); Chunxin Li, Beijing (CN); Zibo Cao, Beijing (CN); Jianyun Zhao, Beijing (CN); Feng Qu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 490 days.

(21) Appl. No.: 18/019,553

(22) PCT Filed: Jan. 25, 2022

(86) PCT No.: PCT/CN2022/073759

§ 371 (c)(1),
(2) Date: Feb. 3, 2023

(87) PCT Pub. No.: WO2023/141759

PCT Pub. Date: Aug. 3, 2023

(65) Prior Publication Data

US 2024/0275009 A1 Aug. 15, 2024

(51) Int. Cl.
*H01P 1/18* (2006.01)
*H01Q 3/36* (2006.01)

(52) U.S. Cl.
CPC ................ *H01P 1/184* (2013.01); *H01P 1/18* (2013.01); *H01Q 3/36* (2013.01)

(58) Field of Classification Search
CPC .................................. H01P 1/184; H01P 1/18
(Continued)

(56) References Cited

U.S. PATENT DOCUMENTS

| | | | | |
|---|---|---|---|---|
| 6,218,911 | B1 | 4/2001 | Kong | |
| 2003/0146806 | A1* | 8/2003 | Nuecther | H01P 1/184 333/156 |

(Continued)

FOREIGN PATENT DOCUMENTS

| | | | |
|---|---|---|---|
| CN | 1883079 | A | 12/2006 |
| CN | 102820499 | A | 12/2012 |

(Continued)

*Primary Examiner* — Benny T Lee
(74) *Attorney, Agent, or Firm* — HOUTTEMAN LAW LLC

(57) ABSTRACT

A phase shifter includes: a first substrate; a signal electrode, a first reference electrode, and a second reference electrode which are on the first substrate; a first insulating layer covering at least a side of the signal electrode distal to the first substrate; and at least one film-bridge electrode group on a side of the first insulating layer distal to the signal electrode. Each film-bridge electrode group includes film-bridge electrodes insulated from each other, and an orthogonal projection of the signal electrode on the first substrate is between orthogonal projections of the first and second reference electrodes on the first substrate. An orthogonal projection of a bridge floor of each film-bridge electrode on the first substrate partially overlaps the orthogonal projection of the signal electrode. Distances between bridge floors of the film-bridge electrodes in a same film-bridge electrode group and the signal electrode are different from each other.

17 Claims, 9 Drawing Sheets

(58) Field of Classification Search
USPC .......................................................... 333/161
See application file for complete search history.

(56) References Cited

U.S. PATENT DOCUMENTS

| | | | | |
|---|---|---|---|---|
| 2005/0212705 | A1* | 9/2005 | Legay et al. .............. | H01P 1/18<br>343/700 MS |
| 2023/0155265 | A1* | 5/2023 | Guo et al. ................. | H01P 1/18<br>343/702 |

FOREIGN PATENT DOCUMENTS

| | | | |
|---|---|---|---|
| CN | 109273842 | A | 1/2019 |
| CN | 110047662 | A | 7/2019 |
| CN | 215497017 | U | 1/2022 |

* cited by examiner

PHASE SHIFTER COMPRISING SIGNAL AND REFERENCE ELECTRODES ON A SUBSTRATE AND FORMING A GAP WITH A PLURALITY OF SPACED FILM-BRIDGE ELECTRODES

CROSS-REFERENCE TO RELATED APPLICATIONS

This is a National Phase Application filed under 35 U.S.C. 371 as a national stage of PCT/CN2022/073759 filed on Jan. 25, 2022, the content of which is incorporated herein by reference in its entirety.

TECHNICAL FIELD

The present disclosure relates to the field of communication technology, and in particular to a phase shifter and an antenna.

BACKGROUND

As the information age develops rapidly, wireless terminals with high integration, miniaturization, multifunction, and low cost have gradually become a development trend of the communication technology. Phase shifters are essential key components in communication and radar applications. Traditional phase shifters mainly include a ferrite phase shifter and a semiconductor phase shifter. The ferrite phase shifter has a relatively large power capacity and a relatively low insertion loss, but the large-scale application of the ferrite phase shifter is limited by factors such as a complex process, a high manufacturing cost, a large volume, and the like of the ferrite phase shifter. The semiconductor phase shifter has a small volume and a high operation speed, but has a relatively small power capacity, a relatively large power consumption, and a high process difficulty.

Compared with the traditional phase shifters, a traditional Micro-Electro-Mechanical System (MEMS) phase shifter has prominent advantages in the aspects of insertion loss, power consumption, volume, cost, and the like, and has attracted wide attention in the fields of radio communication, microwave technology, and the like. However, the conventional MEMS phase shifter has a relatively complex manufacturing process, the improvement of stability and consistency of the conventional MEMS phase shifter becomes a major problem in mass production; further, the conventional MEMS phase shifter requires a large driving voltage.

SUMMARY OF THE INVENTION

Some embodiments of the present disclosure provide a phase shifter and an antenna, which can at least effectively reduce a driving voltage required by the phase shifter to achieve a target phase shift amount.

In a first aspect, a solution to the technical problem of the present disclosure is a phase shifter, including:

- a first substrate;
- a signal electrode, a first reference electrode, and a second reference electrode which are on the first substrate, wherein the first reference electrode and the second reference electrode are on both sides of an extending direction of the signal electrode, respectively;
- a first insulating layer covering at least a side of the signal electrode distal to the first substrate; and
- at least one film-bridge electrode group on a side of the first insulating layer distal to the signal electrode, wherein each film-bridge electrode group includes a plurality of film-bridge electrodes insulated from each other, an orthogonal projection of the signal electrode on the first substrate is between orthogonal projections of the first reference electrode and the second reference electrode on the first substrate, an orthogonal projection of a bridge floor of each of the film-bridge electrodes on the first substrate partially overlaps the orthogonal projection of the signal electrode on the first substrate, an extending direction of the bridge floor of each of the film-bridge electrodes intersects the extending direction of the signal electrode; the bridge floor of at least one of the film-bridge electrodes and the signal electrode have a gap therebetween, and distances between bridge floors of the film-bridge electrodes in a same film-bridge electrode group and the signal electrode are different from each other.

In some examples, each film-bridge electrode of each film-bridge electrode group includes the bridge floor, and a first connecting portion and/or a second connecting portion respectively connected to both ends of the bridge floor, the orthogonal projections of the bridge floor and the signal electrode on the first substrate at least partially overlap each other, an orthogonal projection of the first connecting portion on the first substrate at least partially overlaps the orthogonal projection of the first reference electrode on the first substrate, and/or an orthogonal projection of the second connecting portion on the first substrate at least partially overlaps the orthogonal projection of the second reference electrode on the first substrate.

In some examples, orthogonal projections of the film-bridge electrodes of a same film-bridge electrode group on the first substrate at least partially overlap each other.

In some examples, each film-bridge electrode group includes two film-bridge electrodes which are a first film-bridge electrode and a second film-bridge electrode, respectively, the bridge floor of the first film-bridge electrode is on a side of the bridge floor of the second film-bridge electrode distal to the first substrate; and a distance between the bridge floor of the first film-bridge electrode and the signal electrode is greater than a distance between the bridge floor of the second film-bridge electrode and the signal electrode, and a width of the bridge floor of the first film-bridge electrode is not less than a width of the bridge floor of the second film-bridge electrode.

In some examples, for each film-bridge electrode group, the orthogonal projection of the second film-bridge electrode on the first substrate is in the orthogonal projection of the first film-bridge electrode on the first substrate, and a length of the bridge floor of the first film-bridge electrode is greater than a length of the bridge floor of the second film-bridge electrode.

In some examples, for each film-bridge electrode group, each of the first film-bridge electrode and the second film-bridge electrode includes the bridge floor, and the first connecting portion and the second connecting portion respectively connected to both ends of the bridge floor, the phase shifter further includes a plurality of first connecting electrodes on a side of the first reference electrode distal to the first substrate and a plurality of second connecting electrodes on a side of the second reference electrode distal to the first substrate, the first connecting portion of the first film-bridge electrode is electrically connected to one first connecting electrode, a connecting point between the first connecting portion of the first film-bridge electrode and the one first connecting electrode is a first anchor point, the second connecting portion of the first film-bridge electrode is electrically connected to one second connecting electrode, a connecting point between the second connecting portion of the first film-bridge electrode and the one second connecting electrode is a second anchor point, the first connecting portion of the second film-bridge electrode is electrically connected to another first connecting electrode, and a connecting point between the first connecting portion of the second film-bridge electrode and the another first connecting electrode is a third anchor point, the second connecting portion of the second film-bridge electrode is electrically connected to another second connecting electrode, and a connecting point between the second connecting portion of the second film-bridge electrode and the another second connecting electrode is a fourth anchor point; and the first anchor point is on a side of the third anchor point distal to the signal electrode, the second anchor point is on a side of the fourth anchor point distal to the signal electrode, and a first connecting line connecting between the first anchor point, the second anchor point, the third anchor point and the fourth anchor point is a straight line.

In some examples, the first anchor point and the second anchor point are symmetrically disposed with a center line of the signal electrode in the extending direction of the signal electrode as a symmetry axis, and the third anchor point and the fourth anchor point are symmetrically disposed with the central line of the signal electrode in the extending direction of the signal electrode as a symmetry axis.

In some examples, for each film-bridge electrode group, the extending direction of the bridge floor of the first film-bridge electrode and the extending direction of the bridge floor of the second film-bridge electrode have an angle therebetween, and a length of the bridge floor of the first film-bridge electrode is not less than a length of the bridge floor of the second film-bridge electrode.

In some examples, for each film-bridge electrode group, each of the first film-bridge electrode and the second film-bridge electrode includes the bridge floor, and the first connecting portion and the second connecting portion respectively connected to both ends of the bridge floor, the phase shifter further includes a plurality of first connecting electrodes on a side of the first reference electrode distal to the first substrate and a plurality of second connecting electrodes on a side of the second reference electrode distal to the first substrate;

the first connecting portion of the first film-bridge electrode is electrically connected to one first connecting electrode, a connecting point between the first connecting portion of the first film-bridge electrode and the one first connecting electrode is a first anchor point, the second connecting portion of the first film-bridge electrode is electrically connected to one second connecting electrode, a connecting point between the second connecting portion of the first film-bridge electrode and the one second connecting electrode is a second anchor point, the first connecting portion of the second film-bridge electrode is electrically connected to another first connecting electrode, and a connecting point between the first connecting portion of the second film-bridge electrode and the another first connecting electrode is a third anchor point, the second connecting portion of the second film-bridge electrode is electrically connected to another second connecting electrode, and a connecting point between the second connecting portion of the second film-bridge electrode and the another second connecting electrode is a fourth anchor point; and in the film-bridge electrode groups, a second connecting line connecting between the first anchor points of the first film-bridge electrodes is a straight line, a third connecting line connecting between the second anchor points of the first film-bridge electrodes is a straight line, a fourth connecting line connecting between the third anchor points of the second film-bridge electrodes is a straight line, and a fifth connecting line connecting between the fourth anchor points of the second film-bridge electrodes is a straight line.

In some examples, for each film-bridge electrode group, in a case where the length of the bridge floor of the first film-bridge electrode is equal to the length of the bridge floor of the second film-bridge electrode, the second connecting line and the fourth connecting line coincide with each other, and the third connecting line and the fifth connecting line coincide with each other; and in a case where the length of the bridge floor of the first film-bridge electrode is greater than the length of the bridge floor of the second film-bridge electrode, the second connecting line is on a side of the fourth connecting line distal to the signal electrode, and the third connecting line is on a side of the fifth connecting line distal to the signal electrode.

In some examples, orthogonal projections of the film-bridge electrodes of a same film-bridge electrode group on the first substrate do not overlap each other.

In some examples, for the film-bridge electrode groups, the plurality of the film-bridge electrodes of a same film-bridge electrode group satisfy at least one of the conditions of:

widths of the plurality of the film-bridge electrodes are different from each other; and lengths of the plurality of the film-bridge electrodes are different from each other.

In some examples, each film-bridge electrode group includes two film-bridge electrodes which are a first film-bridge electrode and a second film-bridge electrode, respectively;

a width of the bridge floor of the first film-bridge electrode is greater than a width of the bridge floor of the second film-bridge electrode, a length of the bridge floor of the first film-bridge electrode is greater than a length of the bridge floor of the second film-bridge electrode, and the distance between the bridge floor of the first film-bridge electrode and the signal electrode is greater than the distance between the bridge floor of the second film-bridge electrode and the signal electrode; and relative to the first film-bridge electrode of one film-bridge electrode group, the second film-bridge electrode of the one film-bridge electrode group is closer to the first film-bridge electrode of another film-bridge electrode group adjacent to the one film-bridge electrode group.

In some examples, a distance between the bridge floor of the first film-bridge electrode and the bridge floor of the second film-bridge electrode is less than the distance between the bridge floor of the second film-bridge electrode and the signal electrode.

In some examples, for the film-bridge electrode groups, a distance between any adjacent two of the film-bridge electrodes in a same film-bridge electrode group is a first distance, a distance between any adjacent two of the film-bridge electrode groups is a second distance, and the second distance is greater than the first distance.

In some examples, the phase shifter further includes a controller and a plurality of first bias voltage lines, wherein first ends of the plurality of first bias voltage lines are connected to the film-bridge electrodes of the film-bridge electrode groups, respectively, and second ends of the plurality of first bias voltage lines are connected to the controller.

In some examples, the first connecting portion of each film-bridge electrode of each film-bridge electrode group is electrically connected to the first reference electrode, and/or the second connecting portion of each film-bridge electrode of each film-bridge electrode group is electrically connected to the second reference electrode.

In some examples, the first insulating layer covers a side of the first reference electrode distal to the first substrate, the first connecting portion of each film-bridge electrode of each film-bridge electrode group is insulated from the first reference electrode and fixed to a surface of an overlapping portion of the first insulating layer and the first reference electrode; and/or the first insulating layer covers a side of the second reference electrode distal to the first substrate, the second connecting portion of each film-bridge electrode of each film-bridge electrode group is insulated from the second reference electrode and fixed to a surface of an overlapping portion of the first insulating layer and the second reference electrode.

In some examples, the phase shifter further includes a controller, a plurality of first bias voltage lines, and at least one second bias voltage line, wherein the controller includes a plurality of ports for outputting bias voltages, for each film-bridge electrode group, each of the plurality of first bias voltage lines has a first end connected to one film-bridge electrode and a second end connected to one of the plurality of ports, and each second bias voltage line has a first end connected to the signal electrode and a second end connected to another one of the plurality of ports.

In a second aspect, the present disclosure further provides an antenna, which includes the phase shifter according to any one of the foregoing embodiments.

In the phase shifter and the antenna provided by the present disclosure, since at least some of the film-bridge electrode groups each includes a plurality of film-bridge electrodes with different heights, and each film-bridge electrode, after being applied with a voltage, can form a capacitor with the signal electrode. In other words, the phase shifting capacity of an entire film-bridge electrode group is increased. Compared with a mode of applying a driving voltage to one single film-bridge electrode to realize a target phase shift amount, the phase shifter provided by the present disclosure requires a decreased driving voltage applied to the film-bridge electrodes in the film-bridge electrode group so as to achieve the same target phase shift amount, thereby effectively reducing the driving voltage required by the phase shifter.

DETAILED DESCRIPTION OF THE EMBODIMENTS

Figure 1A:
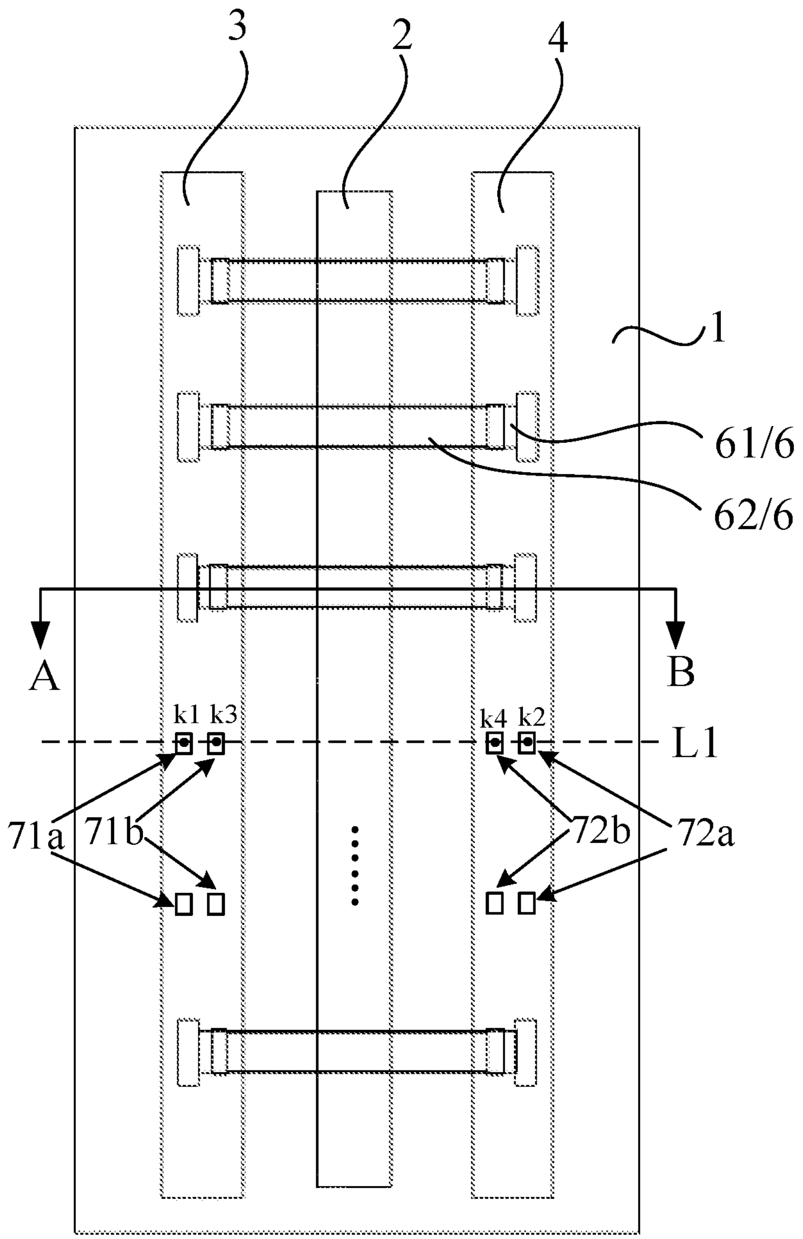
FIG. 1*a* is a schematic diagram (i.e., top view) showing a structure of a phase shifter according to a first embodiment of the present disclosure.

To enable one of ordinary skill in the art to better understand technical solutions of the present disclosure, the present disclosure will be further in detail below with reference to the accompanying drawings and exemplary embodiments.

Unless defined otherwise, technical or scientific terms used herein shall have the ordinary meaning as understood by one of ordinary skill in the art to which the present disclosure belongs. The terms of "first", "second", and the like in the present disclosure are not intended to indicate any order, quantity, or importance, but rather are used for distinguishing one element from another. Similarly, the term "a", "an", "the", or the like used herein does not denote a limitation of quantity, but rather denote the presence of at least one element. The term of "comprising", "including", or the like, means that the element or item preceding the term contains the element or item listed after the term and its equivalent, but does not exclude the presence of other elements or items. The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of an object being described is changed, the relative positional relationships may also be changed accordingly.

It should be noted that in the present disclosure, the expression of two structures disposed "in a same layer" means that the two structures are formed of a same material layer, and thus they are in the same layer in a stacking relationship. However, it is not meant that the two structures are equidistant from a substrate, or other layer structures between the two structures and the substrate are completely the same as each other.

The present disclosure will be described in more detail below with reference to the accompanying drawings. Like elements are denoted by like reference symbols throughout the various figures and description thereof. For purposes of clarity, the various features in the drawings are not necessary drawn to scale. Moreover, some well-known elements may not be shown in the figures.

Some embodiments of the present disclosure provide a phase shifter, as shown in FIGS. 1*a*, 2, 3A-3C, 4-6. The phase shifter includes a first substrate 1, a signal electrode 2, a first reference electrode 3, a second reference electrode 4, a first insulating layer 5 (FIGS. 3A-3C), and at least one film-bridge electrode group 6.

The signal electrode 2, the first reference electrode 3 and the second reference electrode 4 are all arranged on the first substrate 1, and are arranged in a same layer. The first reference electrode 3 and the second reference electrode 4 are located on both sides of an extending direction of the signal electrode 2, and the signal electrode 2, the first reference electrode 3 and the second reference electrode 4 form a coplanar waveguide (CPW) transmission line. The first insulating layer 5 covers at least a side of the signal electrode 2 distal to (i.e., away from) the first substrate 1 to insulate the signal electrode 2 from other electrodes, and in some examples, the first insulating layer 5 further covers a side of each of the first reference electrode 3 and the second reference electrode 4 distal to the first substrate 1 to insulate each of the first reference electrode 3 and the second reference electrode 4 from other electrodes. The at least one film-bridge electrode group 6 is arranged on a side of the first insulating layer 5 distal to the signal electrode 2, and each film-bridge electrode group 6 includes a plurality of film-bridge electrodes (e.g. a first film-bridge electrode 61 and a second film-bridge electrode 62 in FIGS. 1*a*, 2, 3A-3C, 4-6) arranged to be insulated from each other. The signal electrode 2 is positioned in a space defined by the plurality of film-bridge electrodes, the first reference electrode 3 and the second reference electrode 4. Specifically, an orthogonal projection of the signal electrode 2 on the first substrate 1 is positioned between an orthogonal projection of the first reference electrode 3 on the first substrate 1 and an orthogonal projection of the second reference electrode 4 on the first substrate 1, an orthogonal projection of a bridge floor of each film-bridge electrode on the first substrate 1 partially overlaps the orthogonal projection of the signal electrode 2 on the first substrate 1, and an extending direction of the bridge floor of each film-bridge electrode intersects an extending direction of the signal electrode 2. The film-bridge electrodes are arranged to be insulated from the signal electrode 2, a certain distance is formed between the bridge floor of each of the plurality of film-bridge electrodes and the signal electrode 2, and the distances between the bridge floors of the plurality of film-bridge electrodes in a same film-bridge electrode group 6 and the signal electrode 2 are different from each other. The distance between the bridge floor of a film-bridge electrode and the signal electrode 2 is also referred to as a height of the film-bridge electrode. That is, in a film-bridge electrode group 6 including a plurality of film-bridge electrodes, the heights of the plurality of film-bridge electrodes in the same film-bridge electrode group are different from each other. Since each of at least some film-bridge electrode groups 6 includes a plurality of film-bridge electrodes with different heights, and each film-bridge electrode in a same film-bridge electrode group 6 can form a capacitor with the signal electrode 2 after being applied with a voltage. In other words, a phase shifting capacity of the whole film-bridge electrode group 6 is increased. Thus, compared with a method of applying a driving voltage to a single film-bridge electrode and utilizing a capacitor formed between the single film-bridge electrode and the signal electrode 2 to realize a target phase shift amount in the related art, the phase shifter provided by the present disclosure can apply a reduced driving voltage to each film-bridge electrode in a same film-bridge electrode group 6 to achieve the same target phase shift amount as that in the related art, thereby effectively reducing a driving voltage required by the phase shifter.

It should be noted that in the phase shifter according to an embodiment of the present disclosure, the film-bridge electrode group 6 as described above may be implemented in all regions where the film-bridge electrodes are to be disposed, or may be implemented only in some of the regions where the film-bridge electrodes are to be disposed, which is not limited herein. For convenience of description, the following description will be made only with respect to a structure of the region where the film-bridge electrode group 6 is implemented.

Figure 3A:
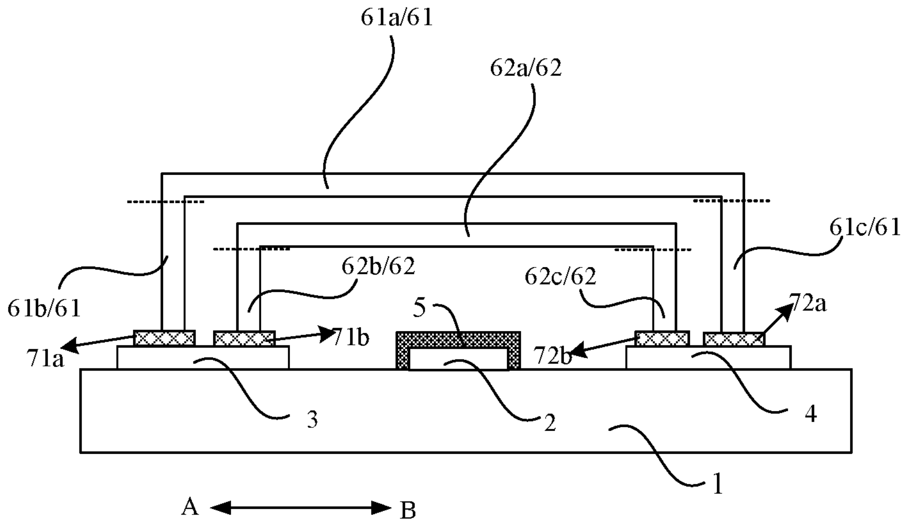
FIG. 3A is a schematic side view of a phase shifter taken along a direction A-B shown in FIG. 1*a*, according to an embodiment of the present disclosure.
Figure 3B:
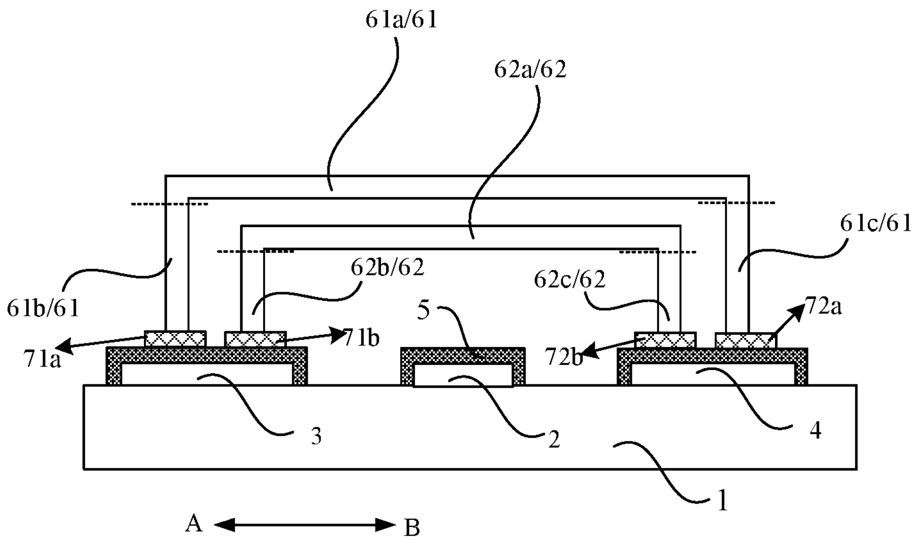
FIG. 3B is another schematic side view of a phase shifter taken along the direction A-B shown in FIG. 1*a*, according to an embodiment of the present disclosure.
Figure 3C:
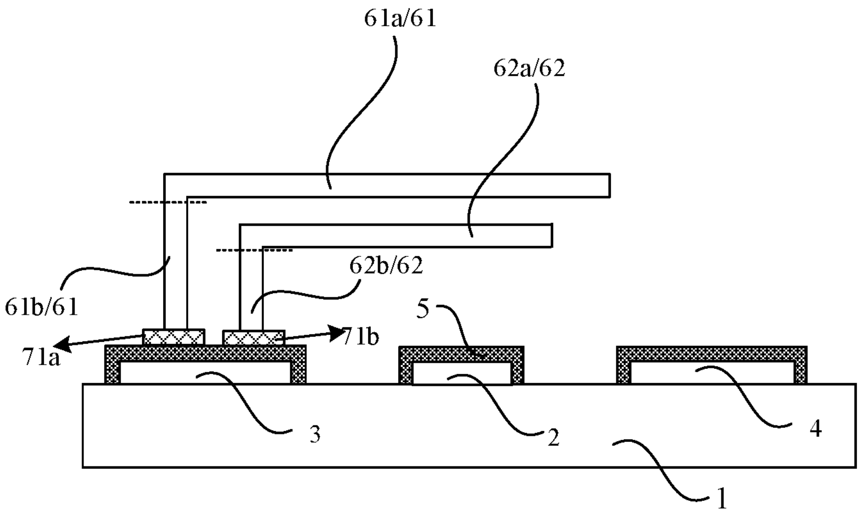
FIG. 3C is another schematic side view of a phase shifter according to an embodiment of the present disclosure.

Some examples are shown in FIGS. 3A to 3C, in which FIGS. 3A and 3B are side views of a phase shifter taken along a direction A-B shown in FIG. 1*a*, and FIG. 3C is a side view of another exemplary phase shifter. Each film-bridge electrode of the film-bridge electrode group 6 having the plurality of film-bridge electrodes includes a bridge floor (e.g., 61*a* or 62*a* shown in the figures) and a first connecting portion (e.g., 61*b* or 62*b* shown in the figures) and/or a second connecting portion (e.g., 61*c* or 62*c* in the figure) which are connected to both ends of the bridge floor, respectively. The bridge floor of each film-bridge electrode is supported by the connecting portion(s) (the first connecting portion and/or the second connecting portion) of the film-bridge electrode to suspend the bridge floor above the signal electrode 2. In the phase shifter according to the present embodiment, each film-bridge electrode may be bridged on the signal electrode 2 by having double connecting portions for supporting the bridge floor (e.g., a structure shown in FIGS. 3A and 3B) or by having a single connecting portion for supporting the bridge floor (e.g., a structure shown in FIG. 3C).

Specifically, if each film-bridge electrode is supported by two arms as shown in FIGS. 3A and 3B, each film-bridge electrode (e.g., the first film-bridge electrode 61 or the second film-bridge electrode 62) includes a bridge floor (e.g., the bridge floor 61*a* of the first film-bridge electrode 61 or the bridge floor 62*a* of the second film-bridge electrode 62), and a first connecting portion (e.g., the first connecting portion 61*b* of the first film-bridge electrode 61 or the first connecting portion 62*b* of the second film-bridge electrode 62) and a second connecting portion (e.g., the second connecting portion 61*c* of the first film-bridge electrode 61 or the second connecting portion 62*c* of the second film-bridge electrode 62) which are connected to both ends of the bridge floor, respectively. The orthogonal projections of the bridge floor of each film-bridge electrode and the signal electrode 2 on the first substrate at least partially overlap each other. Orthogonal projections of each first connecting portion and the first reference electrode 3 on the first substrate 1 at least partially overlap each other, and each first connecting portion is connected between a side of the first reference electrode 3 distal to the first substrate 1 and the bridge floor. Orthogonal projections of each second connecting portion and the second reference electrode 4 on the first substrate 1 at least partially overlap each other, and each second connecting portion is connected between a side of the second reference electrode 4 distal to the first substrate 1 and the bridge floor. Each bridge floor is supported by a corresponding first connecting portion and a corresponding second connecting portion, to be suspended (or hung) on the signal electrode 2.

Further, if each film-bridge electrode is supported by a single arm as shown in FIGS. 3C, each film-bridge electrode (e.g., the first film-bridge electrode 61 or the second film-bridge electrode 62) includes the bridge floor (e.g., the bridge floor 61*a* of the first film-bridge electrode 61 or the bridge floor 62*a* of the second film-bridge electrode 62), and one of the first connecting portion (e.g., the first connecting portion 61*b* of the first film-bridge electrode 61 or the first connecting portion 62*b* of the second film-bridge electrode 62) and the second connecting portion (e.g., the second connecting portion 61*c* of the first film-bridge electrode 61 or the second connecting portion 62*c* of the second film-bridge electrode 62) which are connected to both ends of the bridge floor, respectively, i.e., only one of the first connecting portion and the second connecting portion needs to be provided. The orthogonal projections of the bridge floor of each film-bridge electrode and the signal electrode 2 on the first substrate at least partially overlaps each other. If only the first connecting portion is arranged, the orthogonal projections of the first connecting portion and the first reference electrode 3 on the first substrate 1 at least partially overlap each other, and the first connecting portion is connected between a side of the first reference electrode 3 distal to the first substrate 1 and the bridge floor. If only the second connecting portion is provided, the orthogonal projections of the second connecting portion and the second reference electrode 4 on the first substrate 1 at least partially overlap each other, and the second connecting portion is connected between a side of the second reference electrode 4 distal to the first substrate 1 and the bridge floor. The bridge floor is supported by the first connecting portion and the second connecting portion, and is suspended on the signal electrode 2.

Specifically, each film-bridge electrode may be supported by two arms or one arm according to a practical application, which is not limited herein. For convenience of explanation, each film-bridge electrode is described below in a manner of being supported by two arms (i.e., each film-bridge electrode includes the bridge floor, the first connecting portion, and the second connecting portion).

It should be noted that the phase shifter according to an embodiment of the present disclosure may be a Micro-Electro-Mechanical System (MEMS) phase shifter.

The operational principle of the MEMS phase shifter will be described below as an example. The orthogonal projection of the bridge floor of each film-bridge electrode in each film-bridge electrode group 6 on the first substrate 1 at least partially overlaps the orthogonal projection of the signal electrode 2 on the first substrate 1. Taking the first film-bridge electrode 61 as an example (and the operation principle of another film-bridge electrode is the same as that of the first film-bridge electrode 61), the bridge floor 61*a* of the first film-bridge electrode 61 has a certain elasticity, and thus under the action of a direct current (DC) bias voltage, an electrostatic attraction is generated between the bridge floor 61*a* and the signal electrode 2. The electrostatic attraction can drive the bridge floor 61*a* to move toward the signal electrode 2 in a direction perpendicular to the signal electrode 2, such that the distance between the bridge floor 61*a* and the signal electrode 2 is changed, and a capacitance of the capacitor formed between the bridge floor 61*a* of the first film-bridge electrode 61 and the signal electrode 2 is changed, thereby achieving switching of the capacitor. Specifically, when a DC bias voltage is not applied to the first film-bridge electrode 61, an on-state capacitor Con is formed between the first film-bridge electrode 61 and the signal electrode 2. The on-state capacitor Con is similar to a parallel plate capacitor, and has a low capacitance of the order of fF, where the above distance is a distance between the bridge floor 61*a* and the first insulating layer 5 covering the signal electrode 2. When a DC bias voltage is applied across the first film-bridge electrode 61 and the signal electrode 2, the bridge floor 61*a* is pulled down under the action of the electrostatic attraction, such that the distance between the bridge floor 61*a* and the signal electrode 2 is changed. Thus, an off-state capacitor Coff with a large capacitance is formed between the first film-bridge electrode 61 and the signal electrode 2, and is of about pF magnitude. In this case, the CPW transmission line and the film-bridge electrode applied with the DC bias voltage form a slow wave system, such that an electromagnetic wave transmitted by the CPW transmission line undergoes a phase shift (i.e., phase change) during the process of passing through the slow wave system. By periodically arranging the film-bridge electrode groups in the phase shifter and controlling the film-bridge electrode groups with different numbers and positions, the change of the distributed capacitance can be realized, thereby achieving the change of the phase shift amount. The phase shift amount corresponding to each film-bridge electrode group 6 is determined according to an overlapping area of the bridge floor of each film-bridge electrode in the film-bridge electrode group 6 and the signal electrode 2, and the value of Con/Coft formed between the bridge floor of each film-bridge electrode in the film-bridge electrode group 6 and the signal electrode 2. It should be noted that the DC bias voltage is a driving voltage for each film-bridge electrode group 6.

It should be noted that in the film-bridge electrode groups 6 each having a plurality of film-bridge electrodes, the number of film-bridge electrodes included in each film-bridge electrode group 6 may be greater than or equal to 2, may be adjusted according to practical applications, and is not limited herein. For convenience of explanation, the following description will be given by taking an example in which each film-bridge electrode group 6 having a plurality of film-bridge electrodes includes two film-bridge electrodes, which are referred to as the first film-bridge electrode 61 and the second film-bridge electrode 62, respectively.

In the phase shifter according to an embodiments of the present disclosure, the film-bridge electrodes of the film-bridge electrode group 6 having a plurality of film-bridge electrodes may be arranged in a variety of manners, which will be described by taking the following first to third embodiments as examples.

First Embodiment

Figure 2:
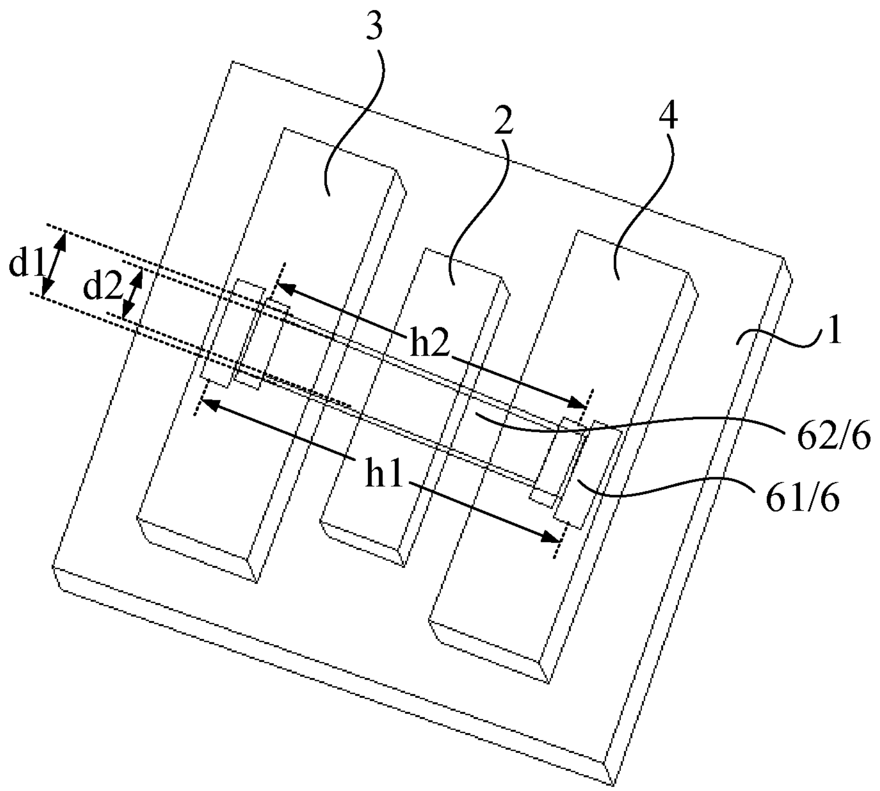
FIG. 2 is a schematic diagram showing a structure of (a single film-bridge electrode group or a single film-bridge electrode set of) a phase shifter according to the first embodiment of the present disclosure.
Figure 5:
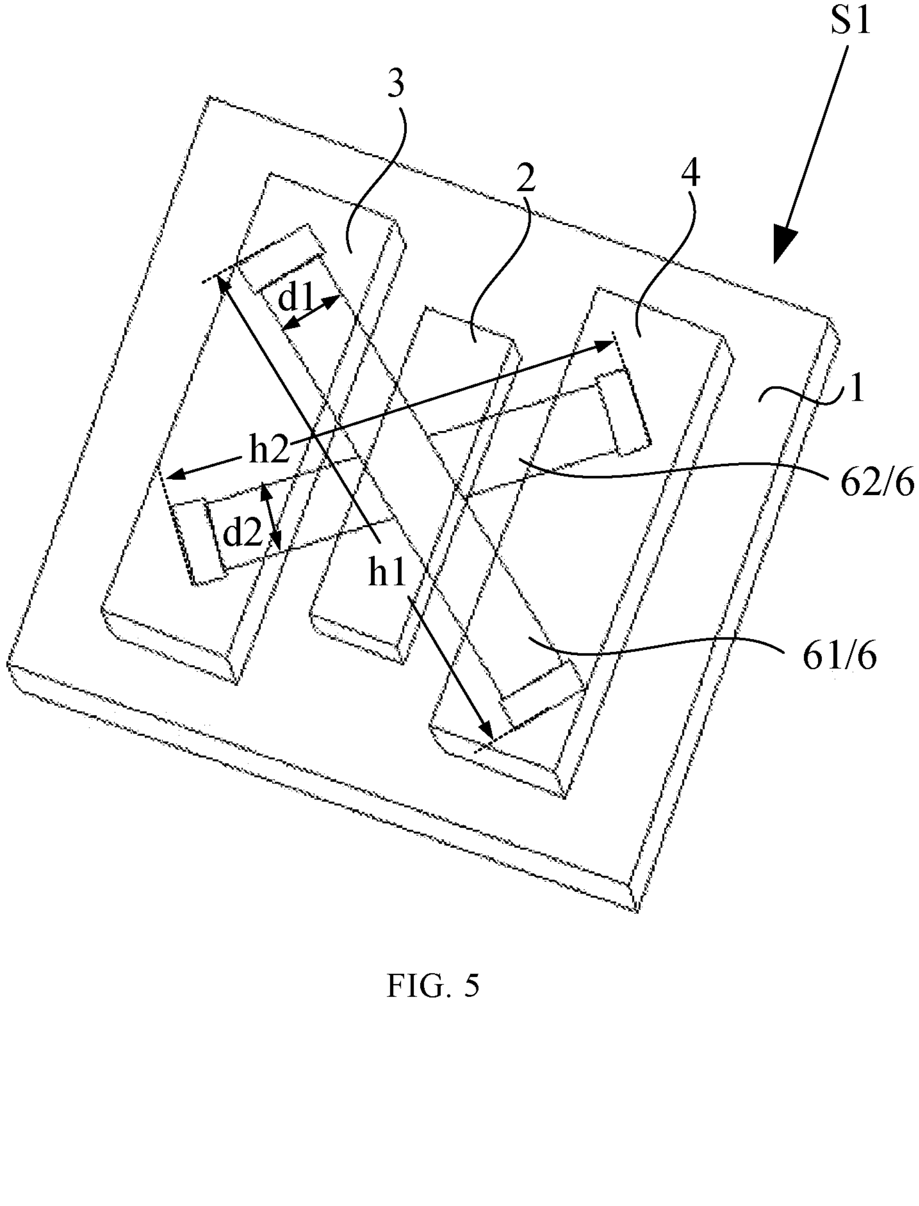
FIG. 5 is a schematic diagram showing a structure of (a single film-bridge electrode group or a single film-bridge electrode set of) a phase shifter according to the second embodiment of the present disclosure.

Referring to FIGS. 1*a* and 2, for the film-bridge electrode groups 6 each having a plurality of film-bridge electrodes, orthogonal projections of the film-bridge electrodes included in a same film-bridge electrode group 6 on the first substrate 1 at least partially overlap each other. In an example in which each film-bridge electrode group 6 having a plurality of film-bridge electrodes includes two film-bridge electrodes, which are the first film-bridge electrode 61 and the second film-bridge electrode 62, respectively, referring to FIGS. 3A and 3B, the first film-bridge electrode 61 may include the bridge floor 61*a*, and the first connecting portion 61*b* and the second connecting portion 61*c* which are connected to both ends of the bridge floor 61*a* of the first film-bridge electrode 61; the second film-bridge electrode 62 may include the bridge floor 62*a*, and the first connecting portion 62*b* and the second connecting portion 62*c* which are connected to both ends of the bridge floor 62*a* of the second film-bridge electrode 62. The bridge floor 61*a* of the first film-bridge electrode 61 is located on a side, which is distal to the first substrate 1, of the bridge floor 62*a* of the second film-bridge electrode 62, and a gap is formed between the bridge floor 61*a* and the bridge floor 62*a*. Further, the distance between the bridge floor 61*a* of the first film-bridge electrode 61 and the signal electrode 2 is greater than the distance between the bridge floor 62*a* of the second film-bridge electrode 62 and the signal electrode 2, and in other words, a height of the first film-bridge electrode 61 is greater than a height of the second film-bridge electrode 62. Further, as shown in FIGS. 2 and 5, a width d1 of the bridge floor 61*a* of the first film-bridge electrode 61 is not less than a width d2 of the bridge floor 62*a* of the second film-bridge electrode 62, i.e., d1≥d2.

In the present embodiment, for each film-bridge electrode group 6 having a plurality of film-bridge electrodes, an orthogonal projection of the second film-bridge electrode 62 on the first substrate 1 is located in an orthogonal projection of the first film-bridge electrode 61 on the first substrate 1, i.e., the bridge floor 61*a* of the first film-bridge electrode 61 overlaps (or covers) the bridge floor 62*a* of the second film-bridge electrode 62. Further, an extending direction (i.e., a lengthwise direction) of the bridge floor 61*a* of the first film-bridge electrode 61 is substantially the same as an extending direction (i.e., a lengthwise direction) of the bridge floor 62*a* of the second film-bridge electrode 62. As shown in FIGS. 2 and 5, a length h1 of the bridge floor 61*a* of the first film-bridge electrode 61 is greater than a length h2 of the bridge floor 62*a* of the second film-bridge electrode 62, i.e., h1>h2, such that the first connecting portion 61*b* connected to one end of the bridge floor 61*a* of the first film-bridge electrode 61 and the first connecting portion 62*b* connected to one end of the bridge floor 62*a* of the second film-bridge electrode 62 have a gap therebetween to be insulated from each other, and the second connecting portion 61*c* connected to the other end of the bridge floor 61*a* of the first film-bridge electrode 61 and the second connecting portion 62*c* connected to the other end of the bridge floor 62*a* of the second film-bridge electrode 62 have a gap therebetween to be insulated from each other.

With reference to FIGS. 1*a*, 3A and 3B, the phase shifter provided by the present embodiment further includes a plurality of first connecting electrodes 71 (e.g., a first connecting electrode 71*a* connected to the first connecting portion 61*b* of the first film-bridge electrode 61 and a first connecting electrode 71*b* connected to the first connecting portion 62*b* of the second film-bridge electrode 62 in FIGS. 3A and 3B) disposed on the side of the first reference electrode 3 distal to the first substrate 1, and a plurality of second connecting electrodes 72 (e.g., a second connecting electrode 72*a* connected to the second connecting portion 61*c* of the first film-bridge electrode 61 and a second connecting electrode 72*b* connected to the second connecting portion 62*c* of the second film-bridge electrode 62 in FIGS. 3A and 3B) disposed on the side of the second reference electrode 4 distal to the first substrate 1. The first connecting electrodes are configured to fix the first connecting portions of the film-bridge electrodes on the side of the first reference electrode 3 distal to the first substrate 1, and the second connecting electrodes are configured to fix the second connecting portions of the film-bridge electrodes on the side of the second reference electrode 4 distal to the first substrate 1. In the embodiment (as shown in FIG. 3A) in which the film-bridge electrodes (including the first film-bridge electrode 61 and the second film-bridge electrode 62) in a film-bridge electrode group 6 are electrically connected to the first reference electrode 3 and/or the second reference electrode 4, the first connecting electrodes are electrically connected to the first connecting portions and the first reference electrode 3, and the second connecting electrodes are electrically connected to the second connecting portions and the second reference electrode 4. In the embodiment (as shown in FIG. 3B) in which the film-bridge electrodes (including the first film-bridge electrode 61 and the second film-bridge electrode 62) in a film-bridge electrode group 6 are insulated from the first reference electrode 3 and/or the second reference electrode 4, the first connecting electrodes are electrically connected to the first connecting portions but are insulated from the first reference electrode 3, and the second connecting electrodes are electrically connected to the second connecting portions but are insulated from the second reference electrode 4.

With continuing reference to FIGS. 1*a*, 3A and 3B, the first connecting portion 61*a* of the first film-bridge electrode 61 is electrically connected to one first connecting electrode 71*a*, and a connecting point between the first connecting portion 61*a* of the first film-bridge electrode 61 and the one first connecting electrode 71*a* is referred to as a first anchor point k1 (FIG. 1*a*). The second connecting portion 61*c* of the first film-bridge electrode 61 is electrically connected to one second connecting electrode 72*a*, and a connecting point between the second connecting portion 61*c* of the first film-bridge electrode 61 and the one second connecting electrode 72*a* is referred to as a second anchor point k2 (FIG. 1*a*). The first connecting portion 62*b* of the second film-bridge electrode 62 is electrically connected to another first connecting electrode 71*b*, and a connecting point between the first connecting portion 62*b* of the second film-bridge electrode 62 and the another first connecting electrode 71 is referred to as a third anchor point k3 (FIG. 1*a*). The second connecting portion 62*c* of the second film-bridge electrode 62 is electrically connected to another second connecting electrode 72*b*, and a connecting point between the second connecting portion 62*c* of the second film-bridge electrode 62 and the another second connecting electrode 72*b* is referred to as a fourth anchor point k4 (FIG. 1*a*). For each film-bridge electrode group 6 having a plurality of film-bridge electrodes, the first anchor point k1 is located on a side of the third anchor point k3 distal to the signal electrode 2, and the second anchor point k2 is located on a side of the fourth anchor point k4 distal to the signal electrode 2. A first connecting line L1 (FIG. 1*a*) connecting the first anchor point k1, the second anchor point k2, the third anchor point k3 and the fourth anchor point k4 together is a straight line, such that the extending directions (i.e., the lengthwise directions) of the bridge floor 61*a* of the first film-bridge electrode 61 and the bridge floor 62*a* of the second film-bridge electrode 62 can be kept consistent with each other, and moving directions of the bridge floor 61*a* of the first film-bridge electrode 61 and the bridge floor 62*a* of the second film-bridge electrode 62 during a movement can be substantially consistent with each other.

In this arrangement, the capacitance formed between a film-bridge electrode group 6 and the signal electrode 2 is a capacitance formed by overlapping portions of the bridge floor 61*a* of the first film-bridge electrode 61 and the signal electrode 2 plus a capacitance formed by overlapping portions of the bridge floor 62*a* of the second film-bridge electrode 62 and the signal electrode 2, and further plus a capacitance formed by overlapping portions of the bridge floor 61*a* of the first film-bridge electrode 61 and the bridge floor 62*a* of the second film-bridge electrode 62 in the case where the first film-bridge electrode 61 and the second film-bridge electrode 62 are not equipotential. Since the moving directions of the bridge floor 61*a* of the first film-bridge electrode 61 and the bridge floor 62*a* of the second film-bridge electrode 62 during a movement are substantially the same, it is possible to ensure that an overlapping area of the bridge floor 61*a* of the first film-bridge electrode 61 and the signal electrode 2, an overlapping area of the bridge floor 62*a* of the second film-bridge electrode 62 and the signal electrode 2, and an overlapping area of the bridge floor 61*a* of the first film-bridge electrode 61 and the bridge floor 62*a* of the second film-bridge electrode 62 are constant, thereby ensuring the stability of the phase shift amount. Further, in this arrangement, the first film-bridge electrode 61 and the second film-bridge electrode 62 are arranged to overlap each other, such that a space occupied by each film-bridge electrode group 6 in a planar direction can be reduced.

Second Embodiment

Figure 4:
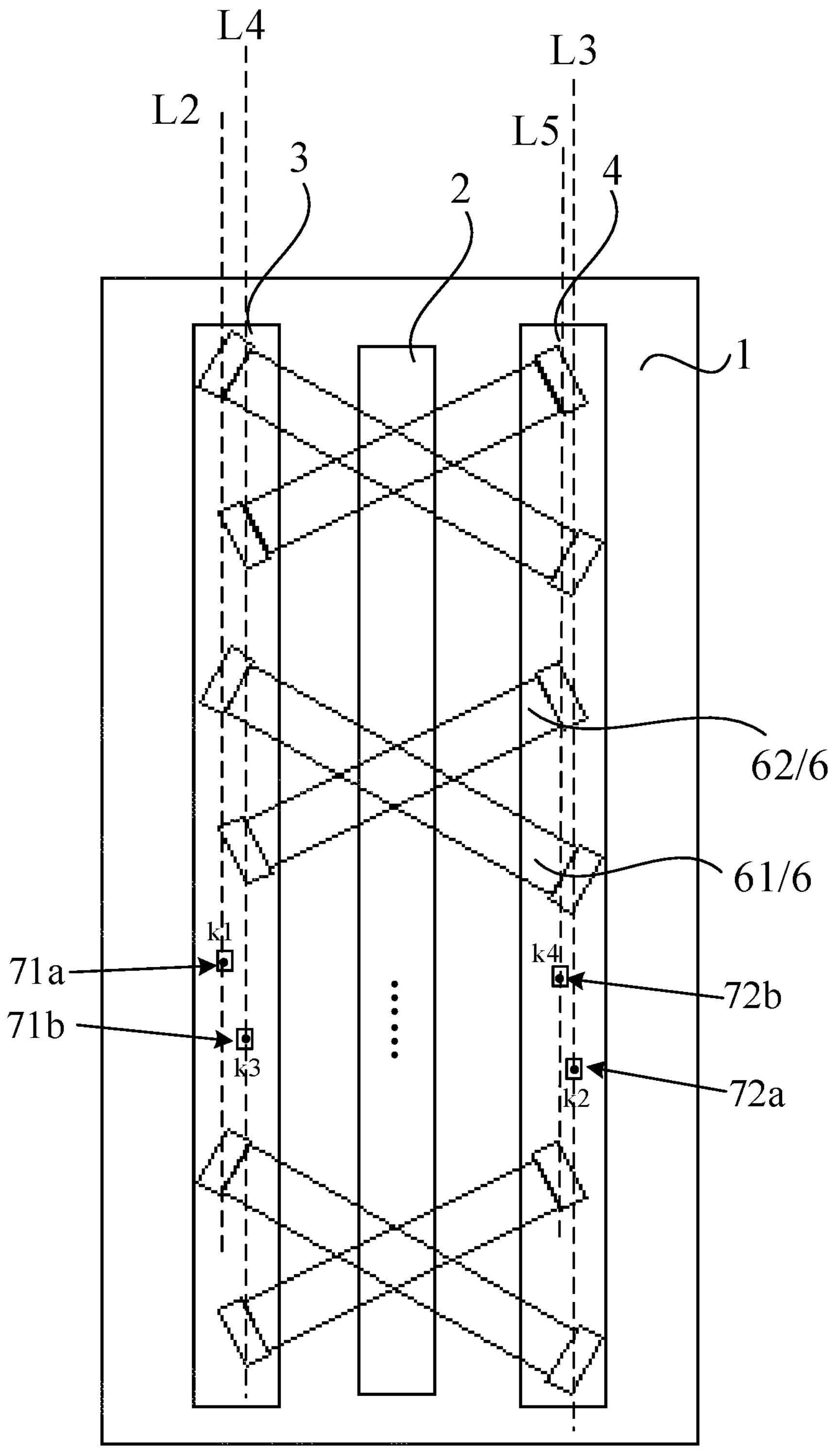
FIG. 4 is a schematic diagram (i.e., top view) showing a structure of a phase shifter according to a second embodiment of the present disclosure.

Referring to FIGS. 4 and 5, for the film-bridge electrode groups 6 each having a plurality of film-bridge electrodes, the orthogonal projections of the film-bridge electrodes included in a same film-bridge electrode group 6 on the first substrate 1 at least partially overlap each other. In an example where each film-bridge electrode group 6 having a plurality of film-bridge electrodes includes two film-bridge electrodes, which are the first film-bridge electrode 61 and the second film-bridge electrode 62, respectively (see FIGS. 3A and 3B), a side view of the phase shifter according to the second embodiment, when viewed in a direction S1 as shown in FIG. 5, is the same as that shown in FIGS. 3A and 3B, and detailed description thereof is omitted here. The first film-bridge electrode 61 may include the bridge floor 61*a*, and the first connecting portion 61*b* and the second connecting portion 61*c* connected to both ends of the bridge floor 61*a* of the first film-bridge electrode 61. The second film-bridge electrode 62 may include the bridge floor 62*a*, and the first connecting portion 62*b* and the second connecting portion 62*c* connected to both ends of the bridge floor 62*a* of the second film-bridge electrode 62. The bridge floor 61*a* of the first film-bridge electrode 61 is located on the side, which is distal to the first substrate 1, of the bridge floor 62*a* of the second film-bridge electrode 62, and a gap is formed between the bridge floor 61*a* of the first film-bridge electrode 61 and the bridge floor 62*a* of the second film-bridge electrode 62. Further, the distance between the bridge floor 61*a* of the first film-bridge electrode 61 and the signal electrode 2 is greater than the distance between the bridge floor 62*a* of the second film-bridge electrode 62 and the signal electrode 2, and in other words, the height of the first film-bridge electrode 61 is greater than the height of the second film-bridge electrode 62. Further, the width d1 of the bridge floor 61*a* of the first film-bridge electrode 61 is not less than the width d2 of the bridge floor 62*a* of the second film-bridge electrode 62, i.e., d1≥d2.

In the present embodiment, for each film-bridge electrode group 6 having a plurality of film-bridge electrodes, the extending direction (i.e., the lengthwise direction) of the bridge floor 61*a* of the first film-bridge electrode 61 and the extending direction (i.e., the lengthwise direction) of the bridge floor 62*a* of the second film-bridge electrode 62 have an angle therebetween, and the length h1 of the bridge floor 61*a* of the first film-bridge electrode 61 is not less than the length h2 of the bridge floor 62*a* of the second film-bridge electrode 62, i.e., h1>h2.

Referring to FIGS. 4, 3A and 3B, the phase shifter provided by the present embodiment further includes a plurality of first connecting electrodes 71*a* and 71*b* (e.g., a first connecting electrode 71*a* connected to the first connecting portion 61*b* of the first film-bridge electrode 61 and a first connecting electrode 71*b* connected to the first connecting portion 62*b* of the second film-bridge electrode 62 in FIGS. 3A and 3B) disposed on the side of the first reference electrode 3 distal to the first substrate 1, and a plurality of second connecting electrodes 72*a* and 72*b* (e.g., a second connecting electrode 72*a* connected to the second connecting portion 61*c* of the first film-bridge electrode 61 and a second connecting electrode 72*b* connected to the second connecting portion 62*c* of the second film-bridge electrode 62 in FIGS. 3A and 3B) disposed on the side of the second reference electrode 4 distal to the first substrate 1. The first connecting electrodes are configured to fix the first connecting portions of the film-bridge electrodes on the side of the first reference electrode 3 distal to the first substrate 1, and the second connecting electrodes are configured to fix the second connecting portions of the film-bridge electrodes on the side of the second reference electrode 4 distal to the first substrate 1. In the embodiment (as shown in FIG. 3A) in which the film-bridge electrodes (including the first film-bridge electrode 61 and the second film-bridge electrode 62) in each film-bridge electrode group 6 are electrically connected to the first reference electrode 3 and/or the second reference electrode 4, the first connecting electrodes are electrically connected to the first connecting portions and the first reference electrode 3, and the second connecting electrodes are electrically connected to the second connecting portions and the second reference electrode 4. In the embodiment (as shown in FIG. 3B) in which the film-bridge electrodes (including the first film-bridge electrode 61 and the second film-bridge electrode 62) in each film-bridge electrode group 6 are insulated from the first reference electrode 3 and/or the second reference electrode 4, the first connecting electrodes are electrically connected to the first connecting portions but are insulated from the first reference electrode 3, and the second connecting electrodes are electrically connected to the second connecting portions but are insulated from the second reference electrode 4.

With continuing reference to FIGS. 4, 5, 3A and 3B, the first connecting portion 61*a* of the first film-bridge electrode 61 is electrically connected to one first connecting electrode 71*a*, and the connecting point between the first connecting portion 61*a* of the first film-bridge electrode 61 and the one first connecting electrode 71*a* is referred to as the first anchor point k1 (FIG. 4). The second connecting portion 61*c* of the first film-bridge electrode 61 is electrically connected to one second connecting electrode 72*a*, and the connecting point between the second connecting portion 61*c* of the first film-bridge electrode 61 and the one second connecting electrode 72*a* is referred to as the second anchor point k2 (FIG. 4). The first connecting portion 62*b* of the second film-bridge electrode 62 is electrically connected to another first connecting electrode 71*b*, and the connecting point between the first connecting portion 62*b* of the second film-bridge electrode 62 and the another first connecting electrode 71*b* is referred to as the third anchor point k3 (FIG. 4). The second connecting portion 62*b* of the second film-bridge electrode 62 is electrically connected to another second connecting electrode 72*b*, and the connecting point between the second connecting portion 62*b* of the second film-bridge electrode 62 and the another second connecting electrode 72*b* is referred to as the fourth anchor point k4 (FIG. 4). A second connecting line L2 (FIG. 4) connecting between the first anchor points k1 of the first film-bridge electrodes 61 of the film-bridge electrode groups 6 each having a plurality of film-bridge electrodes is a straight line. A third connecting line L3 (FIG. 4) connecting between the second anchor points k2 of the first film-bridge electrodes 61 of the film-bridge electrode groups 6 each having a plurality of film-bridge electrodes is a straight line. A fourth connecting line L4 (FIG. 4) connecting between the third anchor points k3 of the second film-bridge electrodes 62 of the film-bridge electrode groups 6 each having a plurality of film-bridge electrodes is a straight line. A fifth connecting line L5 (FIG. 4) connecting between the fourth anchor points k4 of the second film-bridge electrodes 62 of the film-bridge electrode groups 6 each having a plurality of film-bridge electrodes is a straight line. In other words, the corresponding anchor points of the film-bridge electrode groups 6 are aligned with each other in an extending direction of the signal electrode 2, such that it is possible to ensure that the angles, each of which is formed between the extending directions (i.e., the lengthwise directions) of the bridge floor 61*a* of a first film-bridge electrode 61 and the bridge floor 62*a* of a corresponding second film-bridge electrode 62, are maintained to be equal to each other, thereby ensuring that the moving directions of the bridge floor 61*a* of the first film-bridge electrode 61 and the bridge floor 62*a* of the corresponding second film-bridge electrode 62 are substantially stable during a movement.

In some examples, for each film-bridge electrode group 6 having a plurality of film-bridge electrodes, in the case where the length h1 of the bridge floor 61*a* of the first film-bridge electrode 61 is equal to the length h2 of the bridge floor 62*a* of the second film-bridge electrode 62, the second connecting line L2 and the fourth connecting line L4 may coincide with each other, and the third connecting line L3 and the fifth connecting line L5 may coincide with each other. In other examples, in the case where the length h1 of the bridge floor 61*a* of the first film-bridge electrode 61 is greater than the length h2 of the bridge floor 62*a* of the second film-bridge electrode 62, the second connecting line L2 is located on a side of the fourth connecting line L4 distal to the signal electrode 2, and the third connecting line L3 is located on a side of the fifth connecting line L5 distal to the signal electrode 2 (as shown in FIG. 4), such that it can be further ensured that the angles, each of which is formed between the extending directions (i.e., the lengthwise directions) of the bridge floor 61*a* of a first film-bridge electrode 61 and the bridge floor 62*a* of a corresponding second film-bridge electrode 62, are maintained to be equal to each other, thereby ensuring that the moving directions of the bridge floor 61*a* of the first film-bridge electrode 61 and the bridge floor 62*a* of the corresponding second film-bridge electrode 62 are substantially stable during a movement.

In this arrangement, a capacitance formed between each film-bridge electrode group 6 and the signal electrode 2 is a capacitance formed by overlapping portions of the bridge floor 61*a* of the first film-bridge electrode 61 and the signal electrode 2 plus a capacitance formed by overlapping portions of the bridge floor 62*a* of the second film-bridge electrode 62 and the signal electrode 2. Since the moving directions of the bridge floor 61*a* of the first film-bridge electrode 61 and the bridge floor 62*a* of the second film-bridge electrode 62 during a movement are substantially the same, it is possible to ensure that an overlapping area of the bridge floor 61*a* of the first film-bridge electrode 61 and the signal electrode 2, an overlapping area of the bridge floor 62*a* of the second film-bridge electrode 62 and the signal electrode 2, and an overlapping area of the bridge floor 61*a* of the first film-bridge electrode 61 and the bridge floor 62*a* of the second film-bridge electrode 62 are constant, thereby ensuring the stability of the phase shift amount.

Third Embodiment

Figure 6:
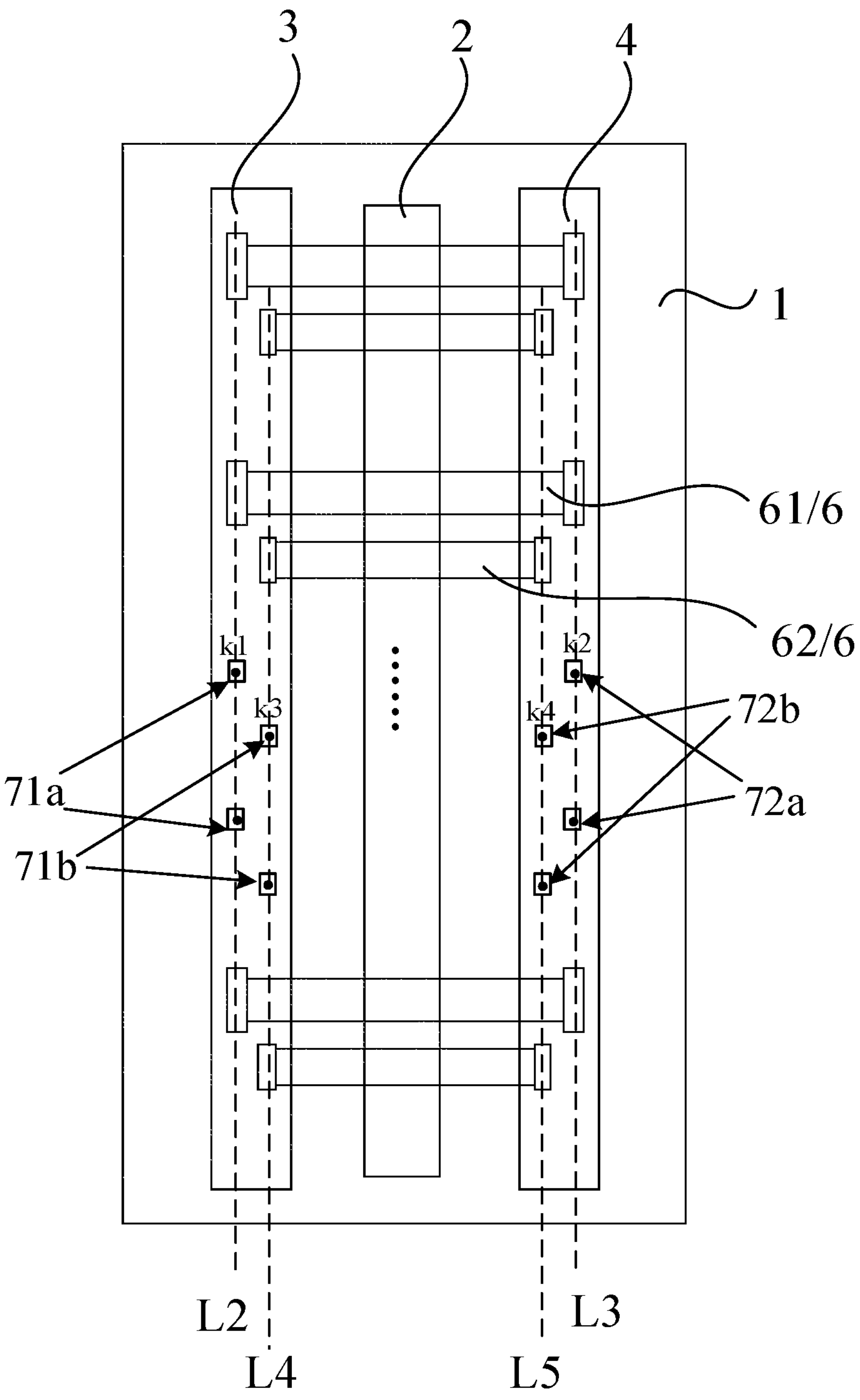
FIG. 6 is a schematic diagram (i.e., top view) showing a structure of a phase shifter according to a third embodiment of the present disclosure.
Figure 7:
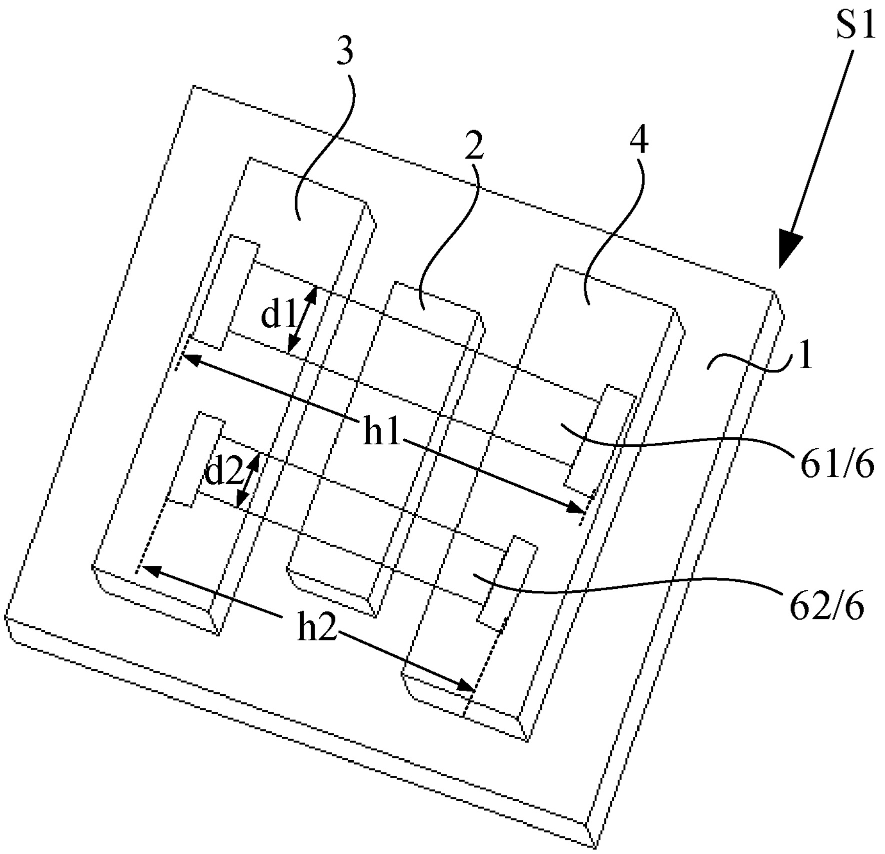
FIG. 7 is a schematic diagram showing a structure of (a single film-bridge electrode group or a single film-bridge electrode set of) a phase shifter according to the third embodiment of the present disclosure.

Referring to FIGS. 6 and 7, for the film-bridge electrode groups 6 each having a plurality of film-bridge electrodes, the orthogonal projections of the film-bridge electrodes in a same film-bridge electrode group 6 on the first substrate 1 do not overlap with each other.

For the film-bridge electrode groups 6 each having a plurality of film-bridge electrodes, the plurality of film-bridge electrodes included in a same film-bridge electrode group 6 satisfy at least one of the following conditions:

(1) the widths of the film-bridge electrodes (e.g., d1 and d2 as shown in FIG. 7) are different from each other; and (2) the lengths of the film-bridge electrodes (e.g., h1 and h2 as shown in FIG. 7) are different from each other.

It should be noted that in the arrangement according to the third embodiment, for the film-bridge electrode groups 6 each having a plurality of film-bridge electrodes, the distances from the bridge floors of the plurality of film-bridge electrodes (e.g., the first film-bridge electrode 61 and the second film-bridge electrode 62) included in a same film-bridge electrode group 6 to the signal electrode may be equal to each other or different from each other, which is not limited herein.

In an example where each film-bridge electrode group 6 having a plurality of film-bridge electrodes includes two film-bridge electrodes, which are the first film-bridge electrode 61 and the second film-bridge electrode 62, respectively, as shown in FIGS. 3A and 3B, a side view of the phase shifter according to the third embodiment, when viewed from the direction S1 as shown in FIG. 7, is the same as those shown in FIGS. 3A and 3B, and detailed description thereof is omitted here. The first film-bridge electrode 61 may include the bridge floor 61*a*, and the first connecting portion 61*b* and the second connecting portion 61*c* which are respectively connected to both ends of the bridge floor 61*a* of the first film-bridge electrode 61. The second film-bridge electrode 62 may include the bridge floor 62*a*, and the first connecting portion 62*b* and the second connecting portion 62*c* which are respectively connected to both ends of the bridge floor 62*a* of the second film-bridge electrode 62. The bridge floor 61*a* of the first film-bridge electrode 61 is located on the side of the bridge floor 62*a* of the second film-bridge electrode 62 distal to the first substrate 1, and a gap is formed between a plane where the bridge floor 61*a* of the first film-bridge electrode 61 is located and a plane where the bridge floor 62*a* of the second film-bridge electrode 62 is located.

Further, taking as an example that the plurality of film-bridge electrodes included in a same film-bridge electrode group 6 satisfy both the conditions (1) and (2), with continuing reference to FIGS. 6, 7, 3A and 3B, in each film-bridge electrode group 6 having a plurality of film-bridge electrodes, the width d1 of the bridge floor 61*a* of the first film-bridge electrode 61 is greater than the width d2 of the bridge floor 62*a* of the second film-bridge electrode 62, the length h1 of the bridge floor 61*a* of the first film-bridge electrode 61 is greater than the length h2 of the bridge floor 62*a* of the second film-bridge electrode 62, and the distance between the bridge floor 61*a* of the first film-bridge electrode 61 and the signal electrode 2 is greater than the distance between the bridge floor 62*a* of the second film-bridge electrode 62 and the signal electrode 2. As such, the overlapping area of the bridge floor 61*a* of the first film-bridge electrode 61 and the signal electrode 2 is greater than the overlapping area of the bridge floor 62*a* of the second film-bridge electrode 62 and the signal electrode 2, and the distance between the bridge floor 61*a* of the first film-bridge electrode 61 and the signal electrode 2 is greater than the distance between the bridge floor 62*a* of the second film-bridge electrode 62 and the signal electrode 2. As a result, a driving voltage required for driving the smaller and closer bridge floor 62*a* of the second film-bridge electrode 62 to move is less than a driving voltage required for driving the larger and farther bridge floor 61*a* of the first film-bridge electrode 61 to move, and the capacitances corresponding to the bridge floor 62*a* and the bridge floor 61*a* are different from each other.

In some examples, for the film-bridge electrode groups 6 each having a plurality of film-bridge electrodes, the second film-bridge electrode 62 is spaced apart from the first film-bridge electrode 61. In other words, relative to the first film-bridge electrode 61 of one film-bridge electrode group 6, the second film-bridge electrode 62 of the one film-bridge electrode group 6 is closer to the first film-bridge electrode 61 of another film-bridge electrode group 6 adjacent to the one film-bridge electrode group 6.

In the present embodiment, for each film-bridge electrode group 6 having a plurality of film-bridge electrodes, the extending direction (i.e., the lengthwise direction) of the bridge floor 61*a* of the first film-bridge electrode 61 and the extending direction (i.e., the lengthwise direction) of the bridge floor 62*a* of the second film-bridge electrode 62 may be substantially the same (as shown in FIG. 6), or may have a certain angle therebetween, which is not limited herein.

Referring to FIGS. 6, 3A and 3B, the phase shifter provided by the present embodiment further includes a plurality of first connecting electrodes 71*a* and 71*b* (e.g., the first connecting electrode 71*a* connected to the first connecting portions 61*b* of the first film-bridge electrodes 61 and the first connecting electrode 71*b* to the first connecting portions 62*b* of the second film-bridge electrode 62 in FIGS. 3A and 3B) disposed on the side of the first reference electrode 3 distal to the first substrate 1, and a plurality of second connecting electrodes 72*a* and 72*b* (e.g., the second connecting electrode 72*a* connected to the second connecting portions 61*c* of the first film-bridge electrode 61 and the second connecting electrode 72*b* connected to the second connecting portion 62*c* of the second film-bridge electrodes 62 in FIGS. 3A and 3B) disposed on the side of the second reference electrode 4 distal to the first substrate 1. The first connecting electrodes are configured to fix the first connecting portions of the film-bridge electrodes on the side of the first reference electrode 3 distal to the first substrate 1, and the second connecting electrodes are configured to fix the second connecting portions of the film-bridge electrodes on the side of the second reference electrode 4 distal to the first substrate 1. In the embodiment (as shown in FIG. 3A) in which the film-bridge electrodes (including the first film-bridge electrode 61 and the second film-bridge electrode 62) in each film-bridge electrode group 6 are electrically connected to the first reference electrode 3 and/or the second reference electrode 4, the first connecting electrodes are electrically connected to the first connecting portions and the first reference electrode 3, and the second connecting electrodes are electrically connected to the second connecting portions and the second reference electrode 4. In the embodiment (as shown in FIG. 3B) in which the film-bridge electrodes (including the first film-bridge electrode 61 and the second film-bridge electrode 62) in each film-bridge electrode group 6 are insulated from the first reference electrode 3 and/or the second reference electrode 4, the first connecting electrodes are electrically connected to the first connecting portions but are insulated from the first reference electrode 3, and the second connecting electrodes are electrically connected to the second connecting portions but are insulated from the second reference electrode 4.

With continuing reference to FIGS. 6, 7, 3A and 3B, the first connecting portion 61*b* of the first film-bridge electrode 61 is electrically connected to one first connecting electrode 71*a*, and the connecting point therebetween is referred to as the first anchor point k1 (FIG. 6). The second connecting portion 61*c* of the first film-bridge electrode 61 is electrically connected to one second connecting electrode 72*a*, and the connecting point therebetween is referred to as the second anchor point k2 (FIG. 6). The first connecting portion 62*b* of the second film-bridge electrode 62 is electrically connected to another first connecting electrode 71*b*, and the connecting point therebetween is referred to as the third anchor point k3 (FIG. 6). The second connecting portion 62*c* of the second film-bridge electrode 62 is electrically connected to another second connecting electrode 72*b*, and the connecting point therebetween is referred to as the fourth anchor point k4 (FIG. 6). The second connecting line L2 (FIG. 6) connecting between the first anchor points k1 of the first film-bridge electrodes 61 of the film-bridge electrode groups 6 each having a plurality of film-bridge electrodes is a straight line. The third connecting line L3 (FIG. 6) connecting between the second anchor points k2 of the first film-bridge electrodes 61 of the film-bridge electrode groups 6 each having the plurality of film-bridge electrodes is a straight line. The fourth connecting line L4 (FIG. 6) connecting between the third anchor points k3 of the second film-bridge electrodes 62 of the film-bridge electrode groups 6 each having the plurality of film-bridge electrodes is a straight line. The fifth connecting line L5 (FIG. 6) connecting between the fourth anchor points k4 of the second film-bridge electrodes 62 of the film-bridge electrode groups 6 each having the plurality of film-bridge electrodes is a straight line. In other words, the corresponding anchor points of the film-bridge electrode groups 6 are aligned with each other in the extending direction of the signal electrode 2. Further, the second connecting line L2 is located on a side of the fourth connecting line L4 distal to the signal electrode 2, and the third connecting line L3 is located on a side of the fifth connecting line L5 distal to the signal electrode 2. In this arrangement, since the film-bridge electrodes in a same film-bridge electrode group 6 do not overlap with each other, the bridge floors of the film-bridge electrodes can be prevented from contacting each other during the process of pulling down the bridge floors of the film-bridge electrodes, thereby reducing difficulty in pulling down.

Alternatively, in the phase shifter provided in an embodiment of the present disclosure, the film-bridge electrode groups 6 may be implemented in other manners, such as any combination of the first to third embodiments, which is not limited herein.

In some examples, as exemplified in the first to third embodiments, in each film-bridge electrode group 6, a distance between the plane where the bridge floor 62*a* of the second film-bridge electrode 62 is located and the plane where the bridge floor 61*a* of the first film-bridge electrode 61 is located is less than the distance between the bridge floor 62*a* of the second film-bridge electrode 62 and the signal electrode 2, and the distance between the bridge floor 62*a* of the second film-bridge electrode 62 and the signal electrode 2 is set according to the minimum distance capable of satisfying the required capacitance. The distance between the plane where the bridge floor 62*a* of the second film-bridge electrode 62 is located and the plane where the bridge floor 61*a* of the first film-bridge electrode 61 is located is set to be small and compact, such that the space occupied by the first film-bridge electrode 61 and the second film-bridge electrode 62 in a direction perpendicular to the first substrate 1 can be reduced, thereby reducing of a size of the phase shifter.

In some examples, as exemplified in the above-described first and third embodiments, in the case where the extending direction of the bridge floor 61*a* of the first film-bridge electrode 61 is the same as the extending direction of the bridge floor 62*a* of the second film-bridge electrode 62 in a same film-bridge electrode group 6, for each film-bridge electrode group 6, the first anchor point k1 and the second anchor point k2 are symmetrically disposed with a center line of the signal electrode 2 in the extending direction of the signal electrode 2 being a symmetry axis, and the third anchor point k3 and the fourth anchor point k4 are symmetrically disposed with the center line of the signal electrode 2 in the extending direction of the signal electrode 2 being the symmetry axis. By such an arrangement, it is possible to further ensure that the overlapping area of the bridge floor 61*a* of the first film-bridge electrode 61 and the signal electrode 2, the overlapping area of the bridge floor 62*a* of the second film-bridge electrode 62 and the signal electrode 2, and the overlapping area of the bridge floor 61*a* of the first film-bridge electrode 61 and the bridge floor 62*a* of the second film-bridge electrode 62 are constant, thereby ensuring the stability of the phase shift amount.

Further, taking the above-described first and third embodiments as examples, in the case where the extending direction of the bridge floor 61*a* of the first film-bridge electrode 61 is the same as the extending direction of the bridge floor 62*a* of the second film-bridge electrode 62 in a same film-bridge electrode group 6, for each film-bridge electrode group 6, the first anchor point k1 and the second anchor point k2 are on a same horizontal line, in other words, an extending direction of a line connecting between the first anchor point k1 and the second anchor point k2 is perpendicular to the extending direction of the signal electrode 2; similarly, the third anchor point k3 and the fourth anchor point k4 are on a same horizontal line, in other words, an extending direction of a line connecting between the third anchor point k3 and the fourth anchor point k4 is perpendicular to the extending direction of the signal electrode 2. By such an arrangement, the overlapping area between the bridge floor 61*a* of the first film-bridge electrode 61 and the signal electrode 2, the overlapping area between the bridge floor 62*a* of the second film-bridge electrode 62 and the signal electrode 2, and the overlapping area between the bridge floor 61*a* of the first film-bridge electrode 61 and the bridge floor 62*a* of the second film-bridge electrode 62 can be further ensured to be unchanged, thereby further ensuring the stability of the phase shift amount.

Figure 8:
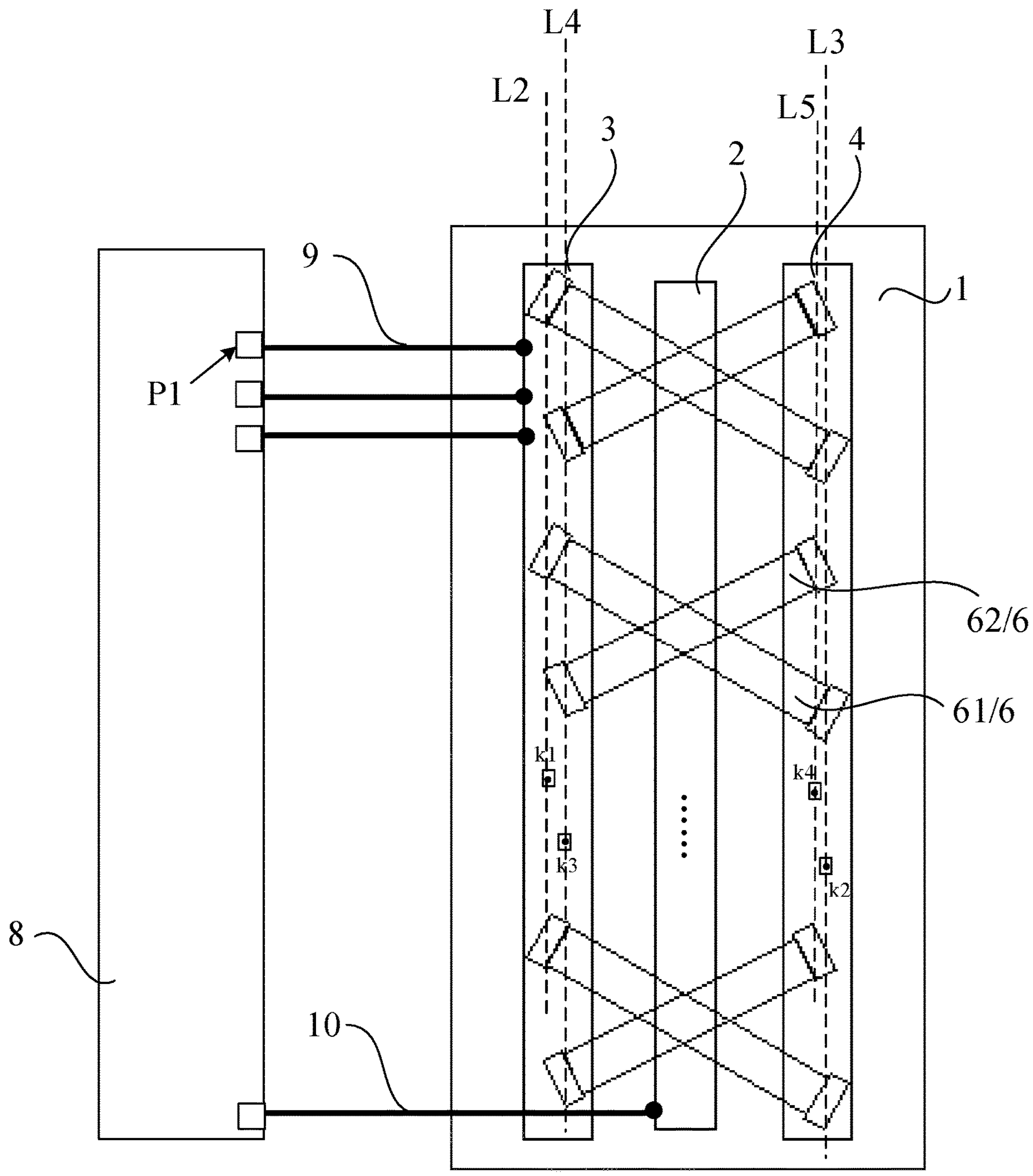
FIG. 8 is a schematic diagram showing a structure of a phase shifter according to an embodiment of the present disclosure.
Figure 9:
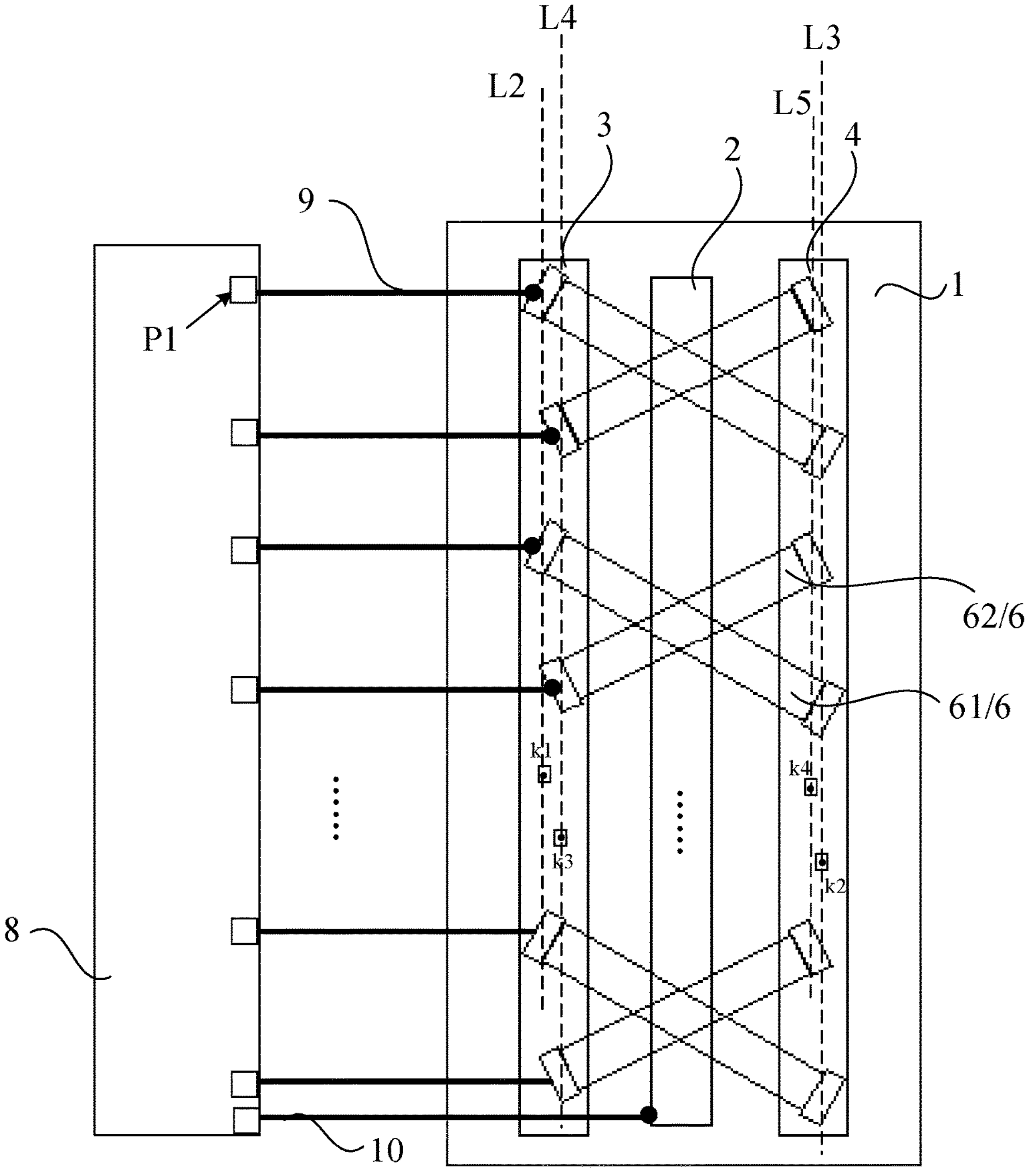
FIG. 9 is another schematic diagram showing a structure of a phase shifter according to an embodiment of the present disclosure.

In some examples, referring to FIGS. 8 and 9, the phase shifter provided by the present embodiment further includes a controller 8, a plurality of first bias voltage lines 9, and at least one second bias voltage line 3. First ends of the first bias voltage lines 9 are connected to the film-bridge electrodes of a plurality of film-bridge electrode groups 6, respectively, and second ends of the first bias voltage lines 9 are connected to the controller 8 to receive a first DC bias voltage. A first end of the second bias voltage line 10 is connected to the signal electrode 2, and a second end of the second bias voltage line 10 is connected to a port of the controller 8 to receive a second DC bias voltage. The first DC bias voltage and the second DC bias voltage may be equal to each other or different from each other. The first DC bias voltage is applied to the film-bridge electrodes through the first bias voltage lines 9, and the second DC bias voltage is applied to the signal electrode 2 through the second bias voltage line 10, such that the overlapping portion of each film-bridge electrode and the signal electrode 2 forms a capacitor, thereby achieving the phase shift.

In the phase shifter provided by the present embodiment, the film-bridge electrode groups 6 each having a plurality of film-bridge electrodes may be driven by two driving methods which are an overall driving method and a multi-step driving method, respectively. There are some differences in structure of the phase shifter in the two driving methods, which will be described in detail below.

First Driving Method

Referring to FIGS. 3A and 8, in the case where the overall driving method is adopted, the film-bridge electrodes of the film-bridge electrode groups 6 are directly and electrically connected to the first reference electrode 3 and/or the second reference electrode 4. Referring to FIG. 3A, taking an example in which each film-bridge electrode includes the first connecting portion and the second connecting portion, the first connecting portion of one film-bridge electrode in the film-bridge electrode group 6 having the plurality of film-bridge electrodes is electrically connected to the first reference electrode 3, and specifically, is connected to the first reference electrode 3 through a first connecting electrode 71*a* and 71*b* (e.g., a first connecting electrode 71*a* connected to the first connecting portion 61*b* of the first film-bridge electrode 61 or a first connecting electrode 71*b* connected to the first connecting portion 62*b* of the second film-bridge electrode 62 in FIG. 3A) disposed on the side of the first reference electrode 3 distal to the first substrate 1. The second connecting portion of the one film-bridge electrode in the film-bridge electrode group 6 having the plurality of film-bridge electrodes is electrically connected to the second reference electrode 4, and specifically, may be electrically connected to the second reference electrode 4 through a second connecting electrode 72*a* and 72*b* (e.g., a second connecting electrode 72*a* connected to the second connecting portion 61*c* of the first film-bridge electrode 61 or a second connecting electrode 72*b* connected to the second connecting portion 62*c* of the second film-bridge electrode 62 in FIG. 3A) disposed on the side of the second reference electrode 4 distal to the first substrate 1. Alternatively, the film-bridge electrode may have only the first connecting portion or the second connecting portion on one side, and in this case, the arrangement on the other side is omitted.

In this method, referring to FIGS. 3A and 8, the first ends of the plurality of first bias voltage lines 9 are directly connected to the first reference electrode 3 and/or the second reference electrode 4, and the second ends of the first bias voltage lines 9 are connected to ports P1 of the controller 8, respectively. The first DC bias voltage is applied to the film-bridge electrodes through a path of the first reference electrode 3 and/or the second reference electrode 4—the first connecting electrode 71*a* and 72*b* (e.g., the first connecting electrode 71*a* connected to the first connecting portion 61*b* of the first film-bridge electrode 61 or the first connecting electrode 71*b* connected to the first connecting portion 62*b* of the second film-bridge electrode 62 in FIG. 3A) and/or the second connecting electrode 72*a* and 72*b* (e.g., the second connecting electrode 72*a* connected to the second connecting portion 61*c* of the first film-bridge electrode 61 or the second connecting electrode 72*b* connected to the second connecting portion 62*c* of the second film-bridge electrode 62 in FIG. 3A)—the film-bridge electrodes, such that the film-bridge electrodes in the film-bridge electrode groups 6 are equipotential (i.e., receive a same potential), thereby realizing the overall driving of the film-bridge electrodes in the film-bridge electrode groups 6. Such a driving method is simple in structure and easy to implement.

Second Driving Method

Referring to FIGS. 3B and 9, in the case where the multi-step driving method is adopted, the film-bridge electrodes in the film-bridge electrode groups 6 are insulated from the first reference electrode 3 and/or the second reference electrode 4. Referring to FIGS. 3B, taking an example in which each film-bridge electrode includes the first connecting portion and the second connecting portion, the first insulating layer 5 covers a side of each of the signal electrode 2, the first reference electrode 3 and the second reference electrode 4 distal to the first substrate 1. The first connecting portion of one film-bridge electrode in the film-bridge electrode group 6 having the plurality of film-bridge electrodes is disposed to be insulated from the first reference electrode 3, is fixed to a surface of an overlapping portion of the first insulating layer 5 and the first reference electrode 3, and specifically, may be fixed to the surface of the overlapping portion of the first insulating layer 5 and the first reference electrode 3 through a first connecting electrode 71*a* and 71*b* (e.g., a first connecting electrode 71*a* connected to the first connecting portion 61*b* of the first film-bridge electrode 61 or a first connecting electrode 71*b* connected to the first connecting portion 62*b* of the second film-bridge electrode 62 in FIG. 3B) disposed on a side, which is distal to the first substrate 1, of the overlapping portion of the first insulating layer 5 and the first reference electrode 3. The second connecting portion of the one film-bridge electrode in the film-bridge electrode group 6 having the plurality of film-bridge electrodes is disposed to be insulated from the second reference electrode 4, is fixed to a surface of an overlapping portion of the first insulating layer 5 and the second reference electrode 4, and specifically, may be fixed to the surface of the overlapping portion of the first insulating layer 5 and the second reference electrode 4 through a second connecting electrode 72*a* and 72*b* (e.g., a second connecting electrode 72*a* connected to the second connecting portion 61*c* of the first film-bridge electrode 61 or a second connecting electrode 72*b* connected to the second connecting portion 62*c* of the second film-bridge electrode 62 in FIG. 3B) disposed on a side, which is distal to the first substrate 1, of the overlapping portion of the first insulating layer 5 and the second reference electrode 4. Alternatively, in the case where each film-bridge electrode has only the first connecting portion or the second connecting portion on one side, the arrangement on the other side is omitted.

In this method, referring to FIGS. 3B and 9, the phase shifter provided by the present embodiment further includes a controller 8, a plurality of first bias voltage lines 9, and at least one second bias voltage line 10. The controller 8 includes a plurality of ports P1 for outputting DC bias voltages. For each film-bridge electrode group 6 having a plurality of film-bridge electrodes, a first end of one first bias voltage line 9 is connected to one film-bridge electrode (e.g., the first film-bridge electrode 61 or the second film-bridge electrode 62), specifically, is connected to the first connecting electrode 71*a* and 72*b* (e.g., the first connecting electrode 71*a* or the first connecting electrode 71*b* in FIG. 3B) or the second connecting electrode 72*a* and 72*b* (e.g., the second connecting electrode 72*a* or the second connecting electrode 72*b* in FIG. 3B) to which the one film-bridge electrode is electrically connected, and a second end of the one first bias voltage line 9 is connected to a port P1 to receive the first DC bias voltage, where different film-bridge electrodes are connected to different first bias voltage lines 9. A first end of the second bias voltage line 10 is connected to the signal electrode 2, and a second end of the second bias voltage line 10 is connected to a port P1 to receive the second DC bias voltage. Since different film-bridge electrodes are connected to different first bias voltage lines 9, and different first bias voltage lines 9 are connected to different ports P1, i.e., the film-bridge electrodes may be driven independently, such that the film-bridge electrodes of a same film-bridge electrode group 6 may be driven independently to realize different phase shift amounts with a gradient. Taking each film-bridge electrode group 6 having a plurality of film-bridge electrodes described in the first to third embodiments as an example, the first film-bridge electrode 61 and the signal electrode 2 may be driven independently to form a first capacitor, the second film-bridge electrode 62 and the signal electrode 2 may be driven independently to form a second capacitor, the first film-bridge electrode 61, and the second film-bridge electrode group 62 and the signal electrode 2 may be driven together to form a third capacitor. The phase shift amounts corresponding to the first capacitor, the second capacitor and the third capacitor are increased in a stepwise manner, such that a phase shift effect with three gradients can be realized by independently driving the first film-bridge electrode 61 and the second film-bridge electrode 62. In this way, a refined and adjustable phase shift mode can be realized.

It should be noted that in the second driving method, the phase shifter may further include a third bias voltage line (not shown in the figures). A first end of the third bias voltage line is connected to the first reference electrode 3 and/or the second reference electrode 4, and a second end of the third bias voltage line is connected to a port P1 of the controller 8, so as to provide a third DC bias voltage to the first reference electrode 3 and/or the second reference electrode 4.

In some examples, referring to FIGS. 1*a*, 2, 3A-3C, 4-6, for the film-bridge electrode groups each having a plurality of film-bridge electrodes, the distances between every adjacent two of the film-bridge electrodes in a same film-bridge electrode group 6 are all a first distance. For example, the distances between the first film-bridge electrode 61 and the second film-bridge electrode 62, which are adjacent to each other, in different film-bridge electrode groups 6 are the same and are all the first distance. For example, the first distance may be a distance between a first anchor point k1 and an adjacent third anchor point k3, or a distance between a second anchor point k2 and an adjacent fourth anchor point k4. In some examples, a distance between any adjacent two of the film-bridge electrode groups 6 is a second distance, i.e., the distance between any adjacent two of the film-bridge electrode groups 6 remains constant. Further, in some examples, the second distance is greater than the first distance.

In some examples, the first substrate 1 may be any one of various types of substrates, such as a glass substrate or a silicon-based substrate.

In some examples, the first substrate 1 is a glass substrate, and in this case, the phase shifter may further include a stress release layer (not shown in the figures) covering a side of the first substrate 1 proximal to the signal electrode 2, the first reference electrode 3 and the second reference electrode 4.

Specifically, the stress release layer may cover the entire side of the first substrate 1. A material of the stress release layer may include any one of various types of materials, and for example, may include at least one of silicon nitride or silicon oxide. In the embodiment that the first substrate 1 is the glass substrate, if metal growth is directly performed on the glass substrate to form a subsequent CPW transmission line, the glass substrate is likely to be warped due to a stress generated by a metal. To avoid such a case, the stress release layer may be deposited on the side of the glass substrate on which metal growth is to be performed before metal growth is performed. The action of the stress release layer offsets the action of the metal growth, to prevent the glass substrate from being warped.

In a second aspect, the present disclosure further provides an antenna, which includes the phase shifter as described above.

It should be understood that the above embodiments are merely exemplary embodiments employed to illustrate the principles of the present disclosure, and the present disclosure is not limited thereto. It will be apparent to one of ordinary skill in the art that various changes and modifications may be made therein without departing from the spirit and essence of the present disclosure, and such changes and modifications are to be considered within the scope of the present disclosure.

What is claimed is:

1. A phase shifter, comprising:

a first substrate;

a signal electrode, a first reference electrode, and a second reference electrode which are on the first substrate, wherein the first reference electrode and the second reference electrode are on both sides of an extending direction of the signal electrode, respectively;

a first insulating layer covering at least a side of the signal electrode distal to the first substrate; and at least one film-bridge electrode group on a side of the first insulating layer distal to the signal electrode, wherein each film-bridge electrode group comprises a plurality of film-bridge electrodes insulated from each other, an orthogonal projection of the signal electrode on the first substrate is between orthogonal projections of the first reference electrode and the second reference electrode on the first substrate, an orthogonal projection of a bridge floor of each of the film-bridge electrodes on the first substrate partially overlaps the orthogonal projection of the signal electrode on the first substrate, an extending direction of the bridge floor of each of the film-bridge electrodes intersects the extending direction of the signal electrode; the bridge floor of at least one of the film-bridge electrodes and the signal electrode have a gap therebetween, and distances between bridge floors of the film-bridge electrodes in a same film-bridge electrode group and the signal electrode are different from each other;

wherein each film-bridge electrode of each film-bridge electrode group comprises the bridge floor, and a first connecting portion and/or a second connecting portion respectively connected to both ends of the bridge floor, the orthogonal projections of the bridge floor and the signal electrode on the first substrate at least partially overlap each other, an orthogonal projection of the first connecting portion on the first substrate at least partially overlaps the orthogonal projection of the first reference electrode on the first substrate, and/or an orthogonal projection of the second connecting portion on the first substrate at least partially overlaps the orthogonal projection of the second reference electrode on the first substrate; and wherein orthogonal projections of the film-bridge electrodes of a same film-bridge electrode group on the first substrate at least partially overlap each other.

2. An antenna, comprising the phase shifter according to claim 1.

3. The phase shifter according to claim 1, wherein for the film-bridge electrode groups, a distance between any adjacent two of the film-bridge electrodes in a same film-bridge electrode group is a first distance, a distance between any adjacent two of the film-bridge electrode groups is a second distance, and the second distance is greater than the first distance.

4. The phase shifter according to claim 1, wherein each film-bridge electrode group comprises two film-bridge electrodes which are a first film-bridge electrode and a second film-bridge electrode, respectively, the bridge floor of the first film-bridge electrode is on a side of the bridge floor of the second film-bridge electrode distal to the first substrate; and a distance between the bridge floor of the first film-bridge electrode and the signal electrode is greater than a distance between the bridge floor of the second film-bridge electrode and the signal electrode, and a width of the bridge floor of the first film-bridge electrode is not less than a width of the bridge floor of the second film-bridge electrode.

5. The phase shifter according to claim 4, wherein for each film-bridge electrode group, the orthogonal projection of the second film-bridge electrode on the first substrate overlaps with the orthogonal projection of the first film-bridge electrode on the first substrate, and a length of the bridge floor of the first film-bridge electrode is greater than a length of the bridge floor of the second film-bridge electrode.

6. The phase shifter according to claim 5, wherein for each film-bridge electrode group, each of the first film-bridge electrode and the second film-bridge electrode comprises the bridge floor, and the first connecting portion and the second connecting portion respectively connected to both ends of the bridge floor, the phase shifter further comprises a plurality of first connecting electrodes on a side of the first reference electrode distal to the first substrate and a plurality of second connecting electrodes on a side of the second reference electrode distal to the first substrate, the first connecting portion of the first film-bridge electrode is electrically connected to one first connecting electrode, a connecting point between the first connecting portion of the first film-bridge electrode and the one first connecting electrode is a first anchor point, the second connecting portion of the first film-bridge electrode is electrically connected to one second connecting electrode, a connecting point between the second connecting portion of the first film-bridge electrode and the one second connecting electrode is a second anchor point, the first connecting portion of the second film-bridge electrode is electrically connected to another first connecting electrode, and a connecting point between the first connecting portion of the second film-bridge electrode and the another first connecting electrode is a third anchor point, the second connecting portion of the second film-bridge electrode is electrically connected to another second connecting electrode, and a connecting point between the second connecting portion of the second film-bridge electrode and the another second connecting electrode is a fourth anchor point; and the first anchor point is on a side of the third anchor point distal to the signal electrode, the second anchor point is on a side of the fourth anchor point distal to the signal electrode, and a first connecting line connecting between the first anchor point, the second anchor point, the third anchor point and the fourth anchor point is a straight line.

7. The phase shifter according to claim 6, wherein the first anchor point and the second anchor point are symmetrically disposed with a center line of the signal electrode in the extending direction of the signal electrode as a symmetry axis, and the third anchor point and the fourth anchor point are symmetrically disposed with the central line of the signal electrode in the extending direction of the signal electrode as a symmetry axis.

8. The phase shifter according to claim 4, wherein for each film-bridge electrode group, the extending direction of the bridge floor of the first film-bridge electrode and the extending direction of the bridge floor of the second film-bridge electrode have an angle therebetween, and a length of the bridge floor of the first film-bridge electrode is not less than a length of the bridge floor of the second film-bridge electrode.

9. The phase shifter according to claim 8, wherein for each film-bridge electrode group, each of the first film-bridge electrode and the second film-bridge electrode comprises the bridge floor, and the first connecting portion and the second connecting portion respectively connected to both ends of the bridge floor, the phase shifter further comprises a plurality of first connecting electrodes on a side of the first reference electrode distal to the first substrate and a plurality of second connecting electrodes on a side of the second reference electrode distal to the first substrate;

the first connecting portion of the first film-bridge electrode is electrically connected to one first connecting electrode, a connecting point between the first connecting portion of the first film-bridge electrode and the one first connecting electrode is a first anchor point, the second connecting portion of the first film-bridge electrode is electrically connected to one second connecting electrode, a connecting point between the second connecting portion of the first film-bridge electrode and the one second connecting electrode is a second anchor point, the first connecting portion of the second film-bridge electrode is electrically connected to another first connecting electrode, and a connecting point between the first connecting portion of the second film-bridge electrode and the another first connecting electrode is a third anchor point, the second connecting portion of the second film-bridge electrode is electrically connected to another second connecting electrode, and a connecting point between the second connecting portion of the second film-bridge electrode and the another second connecting electrode is a fourth anchor point; and in the film-bridge electrode groups, a second connecting line connecting between the first anchor points of the first film-bridge electrodes is a straight line, a third connecting line connecting between the second anchor points of the first film-bridge electrodes is a straight line, a fourth connecting line connecting between the third anchor points of the second film-bridge electrodes is a straight line, and a fifth connecting line connecting between the fourth anchor points of the second film-bridge electrodes is a straight line.

10. The phase shifter according to claim 9, wherein for each film-bridge electrode group, in a case where the length of the bridge floor of the first film-bridge electrode is equal to the length of the bridge floor of the second film-bridge electrode, the second connecting line and the fourth connecting line coincide with each other, and the third connecting line and the fifth connecting line coincide with each other; and in a case where the length of the bridge floor of the first film-bridge electrode is greater than the length of the bridge floor of the second film-bridge electrode, the second connecting line is on a side of the fourth connecting line distal to the signal electrode, and the third connecting line is on a side of the fifth connecting line distal to the signal electrode.

11. The phase shifter according to claim 4, wherein a distance between the bridge floor of the first film-bridge electrode and the bridge floor of the second film-bridge electrode is less than the distance between the bridge floor of the second film-bridge electrode and the signal electrode.

12. The phase shifter according to claim 1, further comprising a controller and a plurality of first bias voltage lines, wherein first ends of the plurality of first bias voltage lines are connected to the film-bridge electrodes of the film-bridge electrode groups, respectively, and second ends of the plurality of first bias voltage lines are connected to the controller.

13. A phase shifter, comprising:

a first substrate;

a signal electrode, a first reference electrode, and a second reference electrode which are on the first substrate, wherein the first reference electrode and the second reference electrode are on both sides of an extending direction of the signal electrode, respectively;

a first insulating layer covering at least a side of the signal electrode distal to the first substrate; and at least one film-bridge electrode group on a side of the first insulating layer distal to the signal electrode, wherein each film-bridge electrode group comprises a plurality of film-bridge electrodes insulated from each other, an orthogonal projection of the signal electrode on the first substrate is between orthogonal projections of the first reference electrode and the second reference electrode on the first substrate, an orthogonal projection of a bridge floor of each of the film-bridge electrodes on the first substrate partially overlaps the orthogonal projection of the signal electrode on the first substrate, an extending direction of the bridge floor of each of the film-bridge electrodes intersects the extending direction of the signal electrode; the bridge floor of at least one of the film-bridge electrodes and the signal electrode have a gap therebetween, and distances between bridge floors of the film-bridge electrodes in a same film-bridge electrode group and the signal electrode are different from each other;

wherein each film-bridge electrode of each film-bridge electrode group comprises the bridge floor, and a first connecting portion and/or a second connecting portion respectively connected to both ends of the bridge floor, the orthogonal projections of the bridge floor and the signal electrode on the first substrate at least partially overlap each other, an orthogonal projection of the first connecting portion on the first substrate at least partially overlaps the orthogonal projection of the first reference electrode on the first substrate, and/or an orthogonal projection of the second connecting portion on the first substrate at least partially overlaps the orthogonal projection of the second reference electrode on the first substrate; and wherein the first connecting portion of each film-bridge electrode of each film-bridge electrode group is electrically connected to the first reference electrode, and/or the second connecting portion of each film-bridge electrode of each film-bridge electrode group is electrically connected to the second reference electrode.

14. An antenna, comprising the phase shifter according to claim 13.

15. A phase shifter, comprising:

a first substrate;

a signal electrode, a first reference electrode, and a second reference electrode which are on the first substrate, wherein the first reference electrode and the second reference electrode are on both sides of an extending direction of the signal electrode, respectively;

a first insulating layer covering at least a side of the signal electrode distal to the first substrate; and at least one film-bridge electrode group on a side of the first insulating layer distal to the signal electrode, wherein each film-bridge electrode group comprises a plurality of film-bridge electrodes insulated from each other, an orthogonal projection of the signal electrode on the first substrate is between orthogonal projections of the first reference electrode and the second reference electrode on the first substrate, an orthogonal projection of a bridge floor of each of the film-bridge electrodes on the first substrate partially overlaps the orthogonal projection of the signal electrode on the first substrate, an extending direction of the bridge floor of each of the film-bridge electrodes intersects the extending direction of the signal electrode; the bridge floor of at least one of the film-bridge electrodes and the signal electrode have a gap therebetween, and distances between bridge floors of the film-bridge electrodes in a same film-bridge electrode group and the signal electrode are different from each other;

wherein each film-bridge electrode of each film-bridge electrode group comprises the bridge floor, and a first connecting portion and/or a second connecting portion respectively connected to both ends of the bridge floor, the orthogonal projections of the bridge floor and the signal electrode on the first substrate at least partially overlap each other, an orthogonal projection of the first connecting portion on the first substrate at least partially overlaps the orthogonal projection of the first reference electrode on the first substrate, and/or an orthogonal projection of the second connecting portion on the first substrate at least partially overlaps the orthogonal projection of the second reference electrode on the first substrate; and wherein the first insulating layer further covers a side of the first reference electrode distal to the first substrate, the first connecting portion of each film-bridge electrode of each film-bridge electrode group is insulated from the first reference electrode and fixed to a surface of an overlapping portion of the first insulating layer and the first reference electrode; and/or the first insulating layer further covers a side of the second reference electrode distal to the first substrate, the second connecting portion of each film-bridge electrode of each film-bridge electrode group is insulated from the second reference electrode and fixed to a surface of an overlapping portion of the first insulating layer and the second reference electrode.

16. The phase shifter according to claim 15, further comprises a controller, a plurality of first bias voltage lines, and at least one second bias voltage line, wherein the controller comprises a plurality of ports for outputting bias voltages, for each film-bridge electrode group, each of the plurality of first bias voltage lines has a first end connected to one film-bridge electrode and a second end connected to one of the plurality of ports, and each second bias voltage line has a first end connected to the signal electrode and a second end connected to another one of the plurality of ports.

17. An antenna, comprising the phase shifter according to claim 15.

* * * * *